United States Patent
Imada

(10) Patent No.: US 8,471,918 B2
(45) Date of Patent: Jun. 25, 2013

(54) IMAGING DEVICE WITH PLURAL IMAGING REGIONS AND PARALLAX COMPUTING PORTION

(75) Inventor: Katsumi Imada, Nara (JP)

(73) Assignee: Panasonic Corporation, Osaka (JP)

( * ) Notice: Subject to any disclaimer, the term of this patent is extended or adjusted under 35 U.S.C. 154(b) by 865 days.

(21) Appl. No.: 12/280,733

(22) PCT Filed: Mar. 22, 2007

(86) PCT No.: PCT/JP2007/055817
§ 371 (c)(1), (2), (4) Date: Aug. 26, 2008

(87) PCT Pub. No.: WO2007/119468
PCT Pub. Date: Oct. 25, 2007

(65) Prior Publication Data
US 2009/0002505 A1   Jan. 1, 2009

(30) Foreign Application Priority Data
Mar. 22, 2006   (JP) .................................. 2006-079256

(51) Int. Cl.
H04N 5/225 (2006.01)

(52) U.S. Cl.
USPC ...................... 348/218.1; 348/302; 348/222.1

(58) Field of Classification Search
USPC .................................... 348/302, 218.1, 222.1
See application file for complete search history.

(56) References Cited

U.S. PATENT DOCUMENTS

| | | |
|---|---|---|
| 6,882,368 B1 | 4/2005 | Suda |
| 2002/0067416 A1 | 6/2002 | Yoneda et al. |
| 2002/0089596 A1 * | 7/2002 | Suda .............................. 348/302 |
| 2003/0086013 A1 | 5/2003 | Aratani |
| 2004/0239699 A1 * | 12/2004 | Uyttendaele et al. ......... 345/716 |
| 2005/0111752 A1 * | 5/2005 | Urard et al. .................... 382/276 |
| 2005/0134698 A1 * | 6/2005 | Schroeder et al. ......... 348/218.1 |
| 2005/0134699 A1 | 6/2005 | Nagashima et al. |
| 2005/0270395 A1 | 12/2005 | Yoneda et al. |

FOREIGN PATENT DOCUMENTS

| | | |
|---|---|---|
| CN | 1739287 | 2/2006 |
| JP | 3397758 | 2/2003 |
| JP | 2003-283907 | 10/2003 |
| JP | 2004-228662 | 8/2004 |

* cited by examiner

*Primary Examiner* — Usman Khan
(74) *Attorney, Agent, or Firm* — Hamre, Schumann, Mueller & Larson, P.C.

(57) ABSTRACT

The generation of a false color at the periphery is prevented in an imaging device including a compound eye optical system in which parallax occurs for each color information. An imaging device that includes a plurality of lens portions, a plurality of imaging regions each including a light receiving surface that is substantially perpendicular to the optical axis direction of each of the lens portions, and outputting an imaging signal, and a parallax computing portion that uses any one of the plurality of imaging signal as a reference imaging signal (G0), and computes a parallax amount of other imaging signals relative to the reference imaging signal (G0), wherein a composite image is generated by correcting and combining the plurality of imaging signals based on an effective pixel signal obtained by deleting a pixel signal obtained from pixels of a region (d min x in the x direction, d min y in the y direction) that may contain image omission resulting from parallax in the imaging signal other than the reference imaging signal (G0), and on the parallax amount.

7 Claims, 22 Drawing Sheets

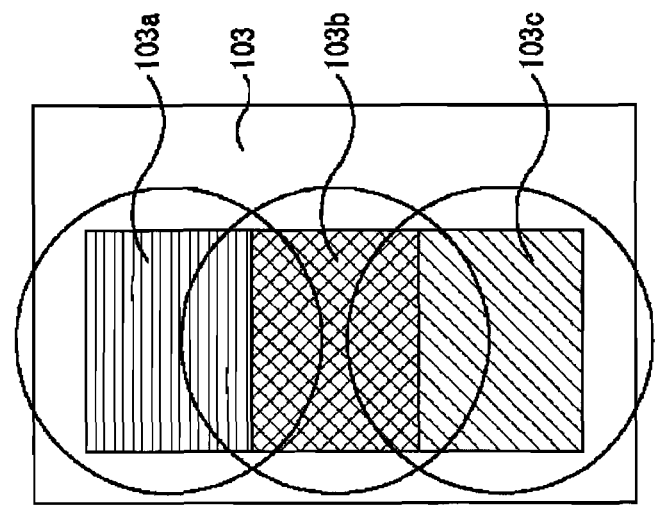
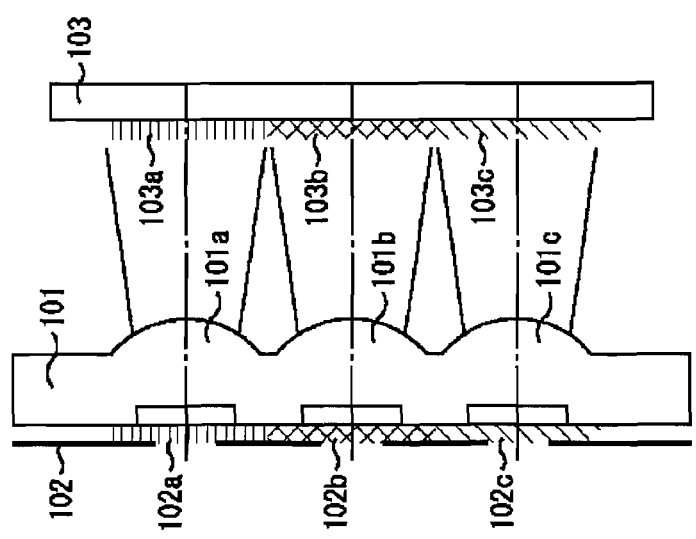

IMAGING DEVICE WITH PLURAL IMAGING REGIONS AND PARALLAX COMPUTING PORTION

TECHNICAL FIELD

The present invention relates to an imaging device that combines multiple images obtained using multiple imaging optical systems into a single high-definition image by performing parallax correction, and an imaging device that calculates the distance to the subject based on the obtained parallax amount.

BACKGROUND ART

With the recent increase in demand for low-profile digital cameras, an imaging device is proposed that is intended to image a single subject by using multiple lenses and image sensors, and combine the obtained images into a single high-quality two-dimensional image.

An example of such a conventional imaging device shall be described with reference to FIG. 17. In the conventional imaging device shown in FIG. 17(a), a numeral 101 denotes an imaging lens formed in a single piece, for example, using a mold. The imaging lens 101 includes a R (red) wavelength lens 101a, a G (green) wavelength lens 101b, and a B (blue) wavelength lens 101c for forming an image of the subject on sensor portions 103a, 103b, and 103c that are divided into pixels of each of the three colors of a C-MOS sensor 103, which will be described later.

A numeral 102 denotes the respective aperture stops of the lenses 101a to 101c that are formed integrally. An R-wavelength transmission filter 102a, a G-wavelength transmission filter 102b, and a B-wavelength transmission filter 102c are additionally integrated with the aperture stop 102.

A numeral 103 denotes a C-MOS sensor in which an image processing circuit and so on, not shown, are integrally formed. As shown in FIG. 17(b), the sensors 103a, 103b and 103c for R, G, and B, respectively, are formed on planes that are independent from one another. Accordingly, for the same pixel size and the same number of pixels, the focal length of the lenses can be $(1/3)^{1/2}$ that of a conventional Bayer array sensor, and the thickness in the optical axis direction can be reduced (see JP 3397758 B).

DISCLOSURE OF INVENTION

Problem to be Solved by the Invention

However, in the case of such a conventional imaging device having a reduced thickness, it is necessary to combine images formed on the three different sensor portions into a single image. Usually, with an optical system in which multiple optical axes are present as shown in FIG. 17, even if the same subject is imaged on the sensor portions 103a, 103b and 103c, the positions relative to the center of their respective optical axes are displaced in the resulting image. Such displacement is called parallax. Parallax is dependent on the distance to the subject, and the direction in which parallax occurs is determined by the positional relationship between each of the imaging lenses and the sensor portions, which serve as a reference, and the subject.

In this respect, FIG. 18 shows an example of the images formed on the sensor portions 103a, 103b and 103c. When the imaging lens 101b and the sensor portion 103b are taken as a reference, an image 104a on the sensor portion 103a corresponds to an image resulting from the displacement of an image 104b formed on the sensor portion 103b in the y direction by an amount of parallax. Meanwhile, an image 104c formed on the sensor portion 103c corresponds to an image resulting from the displacement of the image 104b formed on the sensor portion 103b in the negative y direction by an amount of parallax.

To combine the images formed on the sensor portions 103a, 103b and 103c into a single image, it is necessary to detect parallax, and combine the images after correcting that parallax. However, as can be seen from FIG. 18, a part of the image 104a formed on the sensor portion 103a for R in the positive y direction has been omitted, as compared with the image 104b formed on the sensor portion 103b for G. On the other hand, a part of the image 104c formed on the sensor portion 103c for B in the negative y direction has been omitted. Therefore, it can be seen that combining the images 104a, 104b and 104c can only produce an image of a region that has all the color information (i.e., a portion of the subject). In other words, there is the problem of generation of a false color (a region that is reproduced in a color different from the original color) at the periphery of the image.

Also in the case where the function of measuring a distance by utilizing parallax is added, there is the problem of incapability of distance measurement for the subject located at the periphery of the image.

The present invention was achieved in order to solve such problems, and it is an object of the invention to provide an imaging device that overcomes defects resulting from image omission at the periphery of an image as a result of parallax, which has been the problem with compound eye optical systems in which parallax occurs for each color information. More specifically, it is an object of the invention to provide a low-profile imaging device capable of reproducing an image having no false color at the periphery of the image by correcting the effective pixel region in view of parallax and capable of performing distance measurement for the periphery of the image.

Means for Solving Problem

In order to achieve the above-described object, a first imaging device according to the present invention includes: a plurality of lens portions each including at least one lens; a plurality of imaging regions corresponding one-to-one with the plurality of lens portions, the plurality of imaging regions each including a light receiving surface substantially perpendicular to an optical axis direction of the corresponding lens portion, and each outputting an imaging signal; a parallax computing portion that uses any one of imaging signals respectively outputted from the plurality of imaging regions as a reference imaging signal, and computes a parallax amount of other imaging signals relative to the reference imaging signal; and an effective pixel region correcting portion that deletes, from the reference imaging signal, a pixel signal obtained from pixels of a region that may contain image omission resulting from parallax in the imaging signal other than the reference imaging signal, and outputs the resulting effective pixel signal.

With the above-described configuration, the effective pixel region correcting portion deletes, from the reference imaging signal, a pixel signal obtained from pixels of a region that may contain image omission resulting from parallax in the imaging signal other than the reference imaging signal, and outputs the resulting effective pixel signal. Accordingly, using this effective pixel signal can solve the problem in the subsequent stage caused by image omission resulting from parallax at the periphery of the image, which has been a conventional problem with compound eye optical systems in which parallax occurs for each color information.

Examples of the process in the subsequent stage include: (1) an image combining process of generating a composite image by correcting and combining the plurality of imaging signals based on the effective pixel signal outputted from the effective pixel region correcting portion and the parallax amount computed by the parallax computing portion, and outputting the composite image; and (2) a distance calculating process of calculating the distance to a subject based on the effective pixel signal outputted from the effective pixel region correcting portion and the parallax amount computed by the parallax computing portion.

That is, with a configuration further including an image combining portion for performing the image combining process described in (1) above, the plurality of imaging signals are corrected and combined based on the effective pixel signal outputted from the effective pixel region correcting portion and the parallax amount computed by the parallax computing portion. Accordingly, it is possible to realize an image that does not include a false color at the periphery of the image.

Further, with a configuration further including a distance calculating portion for performing the distance calculation process described in (2) above, the distance to a subject is calculated based on the effective pixel signal outputted from the effective pixel region correcting portion and the parallax amount computed by the parallax computing portion. Accordingly, distance measurement can be performed also at the periphery of the image.

In the first imaging device, it is preferable that the effective pixel region correcting portion determines the range of a region that may contain image omission resulting from parallax based on the parallax amount of a subject located at the shortest subject distance.

In the first imaging device, it is preferable that the plurality of imaging regions are first to fourth imaging regions arranged in two vertical rows and two horizontal lines, the parallax computing portion uses an imaging signal outputted from the first imaging region as a reference imaging signal, and the effective pixel region correcting portion deletes, from the reference imaging signal, pixel signals obtained from pixels on a side located in the positive direction of the direction of parallax that a second imaging signal outputted from the second imaging region laterally adjacent to the first imaging region has relative to the reference imaging signal, and a side located in the positive direction of the direction of parallax that a third imaging signal outputted from the third imaging region longitudinally adjacent to the first imaging region has relative to the reference imaging signal.

In the first imaging device, it is preferable that, of the first to fourth imaging regions, the first imaging region and the fourth imaging region that are diagonally arranged are sensitive to the same wavelength range, and the second imaging region and the third imaging region are sensitive to wavelength ranges that are different from that of the first and fourth imaging regions and that are different from each other, and the parallax computing portion uses the imaging signal outputted from the first imaging region as a reference imaging signal, obtains a parallax amount that a fourth imaging signal outputted from the fourth imaging region has relative to the reference imaging signal, and decomposes the parallax amount into vectors, thereby obtaining a parallax amount that the second imaging signal has relative to the reference imaging signal, and a parallax amount that the third imaging signal has relative to the reference imaging signal.

In the first imaging device, it is further preferable that the first and second imaging regions are sensitive to the green wavelength range, and the second and third imaging regions are sensitive to the red wavelength range and the blue wavelength range, respectively.

Furthermore, it is preferable that the first imaging device further includes an omission determining portion that divides, into blocks, a region in the reference imaging signal that may contain image omission resulting from parallax in imaging signal other than the reference imaging signal, obtains a parallax amount for each of the blocks, and determines, based on the obtained parallax amount, whether or not each of the blocks will be actually omitted in the imaging signal other than the reference imaging signal, wherein the effective pixel region correcting portion includes, in the effective pixel signal, the pixels of the block that has been determined not to be omitted by the omission determining portion.

In order to achieve the above-described object, a second imaging device according to the present invention includes: a plurality of lens portion each including at least one lens; a plurality of imaging regions corresponding one-to-one with the plurality of lens portions, the plurality of imaging regions each including a light receiving surface substantially perpendicular to an optical axis direction of the corresponding lens portion, and each outputting an imaging signal; and a parallax computing portion that uses any one of imaging signals respectively outputted from the plurality of imaging regions as a reference imaging signal, and computes a parallax amount of other imaging signals relative to the reference imaging signal, wherein, of the plurality of imaging regions, the imaging region other than a reference imaging region that outputs the reference imaging signal have a light receiving surface larger than the light receiving surface of the reference imaging region.

It is preferable that the second imaging device further includes an image combining portion that generates a composite image by correcting and combining the plurality of imaging signals based on the parallax amount, and outputs the composite image, since this makes it possible to realize an image that does not contain a false color at the periphery of the image.

Alternatively, it is preferable that the second imaging device further includes a distance calculating portion that calculates the distance to a subject based on the reference imaging signal and the parallax amount computed by the parallax computing portion, since this makes it possible to perform distance measurement also at the periphery of the image.

In the second imaging device, it is preferable that, of the imaging region other than the reference imaging region, the light receiving surface of the imaging region adjacent to the reference imaging region is increased as compared with the reference imaging region toward a side opposite to the side adjacent to the reference imaging region, and the light receiving surface of the imaging region diagonally arranged with the reference imaging region is increased as compared with the reference imaging region towards two sides that are distant from the reference imaging region.

Effects of the Invention

As described above, the present invention can provide an imaging device for which the conventional problems of a false color at the periphery of an image, and of incapability of distance measurement for the periphery of an image have been improved in a compound eye optical system in which parallax occurs for each color information.

BRIEF DESCRIPTION OF DRAWINGS

FIG. 17 is a diagram showing the configuration of a conventional imaging device.

DESCRIPTION OF THE INVENTION

First Embodiment

Hereinafter, a first embodiment of the present invention shall be described with reference to the drawings.

Figure 1:
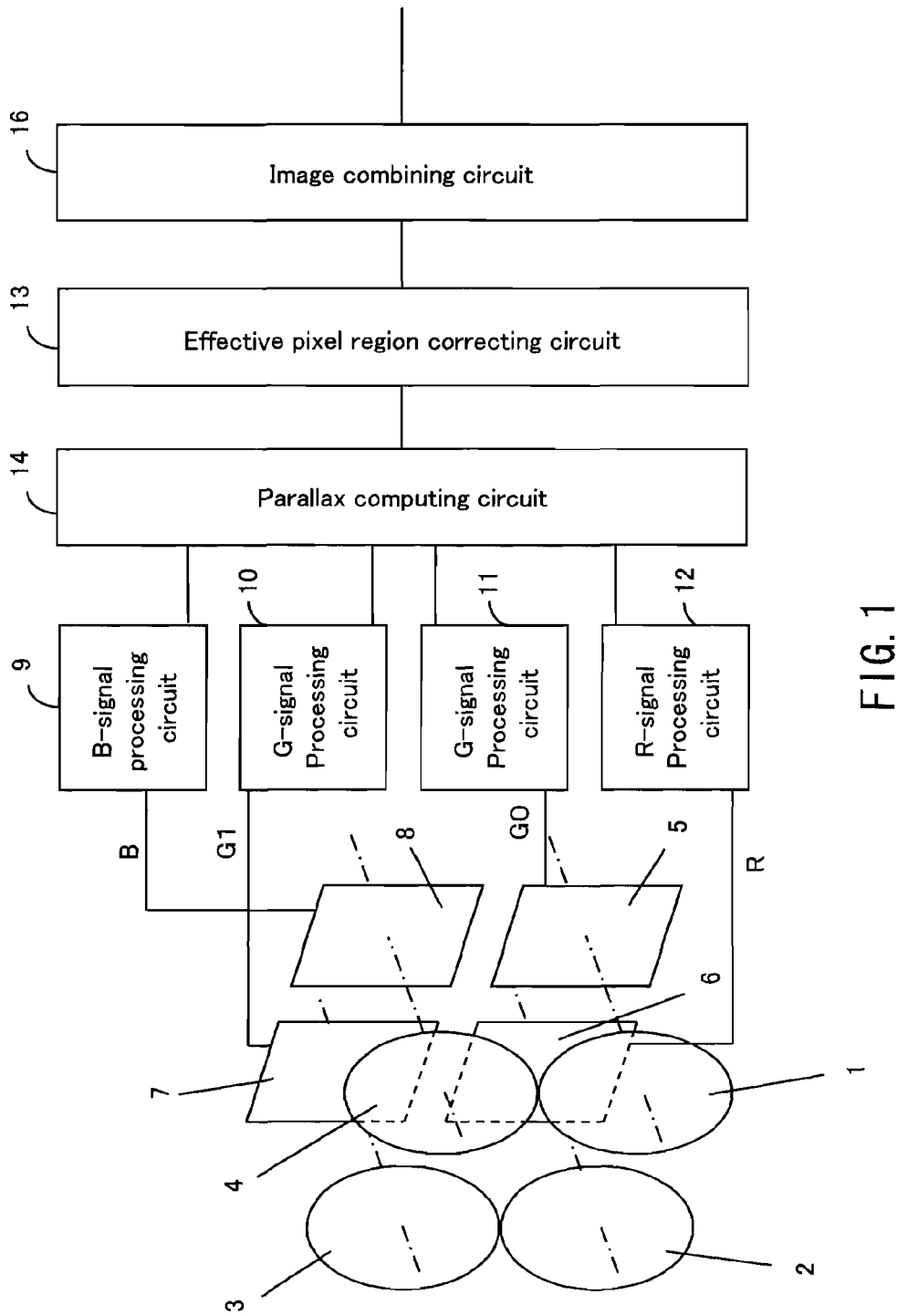
FIG. 1 is a block diagram schematically showing the configuration of an imaging device according to a first embodiment of the present invention.

FIG. 1 is a diagram schematically showing the configuration of an imaging device according to an embodiment of the present invention. In FIG. 1, numerals 1 to 4 denote imaging optical systems, each including at least one lens. Image sensors 5 to 8 are provided respectively corresponding to the imaging optical systems 1 to 4. The same subject is imaged on each of the image sensors 5 to 8 via each of the imaging optical systems 1 to 4.

In this embodiment, of the image sensors 5 to 8, the image sensors 5 and 7, which are diagonally arranged, image the green wavelength band, the image sensor 6 images the red wavelength band, and the image sensor 8 images the blue wavelength band, in order to capture a color image. Such wavelength selectivity may be realized by providing the image sensors with wavelength dependence, or may be realized by inserting wavelength selective filters (color filters) or the like.

Imaging signals of the image sensors 5 to 8 are subjected to image processing performed by an R-signal processing circuit 12, G-signal processing circuits 10 and 11, and a B-signal processing circuit 9, respectively, and then sent to a parallax computing circuit 14. The parallax computing circuit 14 uses any of the signals received from the R-signal processing circuit 12, the G-signal processing circuits 10 and 11, and the B-signal processing circuit 9 as a reference signal, and obtains the amount of parallax of other signals with this reference signal. The parallax amounts obtained by the parallax computing circuit 14 are sent to an image combining circuit 16, along with the R signal, the G signals, and the B signal. An effective pixel region correcting circuit 13 deletes, from the stated reference imaging signal, pixel signals obtained from those pixels located in a region that may contain image omission resulting from parallax in the imaging signals other than the reference imaging signal, and outputs the resulting effective pixel signal to the image combining circuit 16. The image combining circuit 16 corrects the R signal, the G signals, and the B signal based on the effective pixel signal and the parallax amounts, and combines these signals. Thus, a color image is outputted. Although only those components that are related to the feature of the present invention are mainly shown in FIG. 1, a circuit that performs arbitrary image processing such as a variety of correction processing or preprocessing may be provided in addition to the components shown in FIG. 1, to implement the imaging device of the present invention.

Here, the flow of the image combination shall be described briefly. As shown in FIG. 1, the imaging optical systems 1 and 3, and the image sensors 5 and 7 used for the green wavelength band are diagonally arranged in the imaging device of this embodiment. In this embodiment, the parallax computing circuit 14 uses, as a reference image (indicated as "G0"), an image outputted from the image sensor 5 of the image sensors 5 and 7 that output a green image signal, and compares the reference image G0 with an image outputted from the image sensor 7 (indicated as "G1"), thereby calculating a parallax amount. However, which of the images formed by the multiple imaging optical systems is used as the reference image is a matter of design that can be freely determined.

Since the images are formed by simultaneously imaging the subject at various distances, the parallax computing circuit 14 of the imaging device according to this embodiment divides each of the images that are to be compared into small blocks, and obtains the parallax amount of the entire image by calculating the parallax amount on a block-by-block basis. That is to say, the parallax computing circuit 14 obtains the parallax amount between the reference image G0 and the image G1 by comparing the reference image G0 outputted from the image sensor 5 and the image G1 outputted from the image sensor 7 on a block-by-block basis.

Further, the parallax computing circuit 14 calculates the parallax amount of an image (R) outputted from the image sensor 6 and the parallax amount of an image (B) outputted from the image sensor 8 by decomposing the parallax amount of the image G1 (the parallax amount relative to the reference image G0) into vectors. More specifically, the parallax amount of the image R and the parallax amount of the image B, relative to the reference image G0, can be obtained by decomposing the parallax amount of the reference image G0 relative to the image G1 into a vector in the direction from the reference image G0 to the image R of the image sensor 6, and a vector in the direction from the reference image G0 to the image B of the image sensor 8, respectively.

The thus obtained parallax amounts are sent to the image combining circuit 13, along with the respective signals of the reference image G0, the image G1, the image R, and the image B. The image combining circuit 13 corrects the parallax amounts of the image G1, the image R, and the image B, and superimposes the resulting images on the reference image G0, thereby reproducing a color image.

Figure 2:
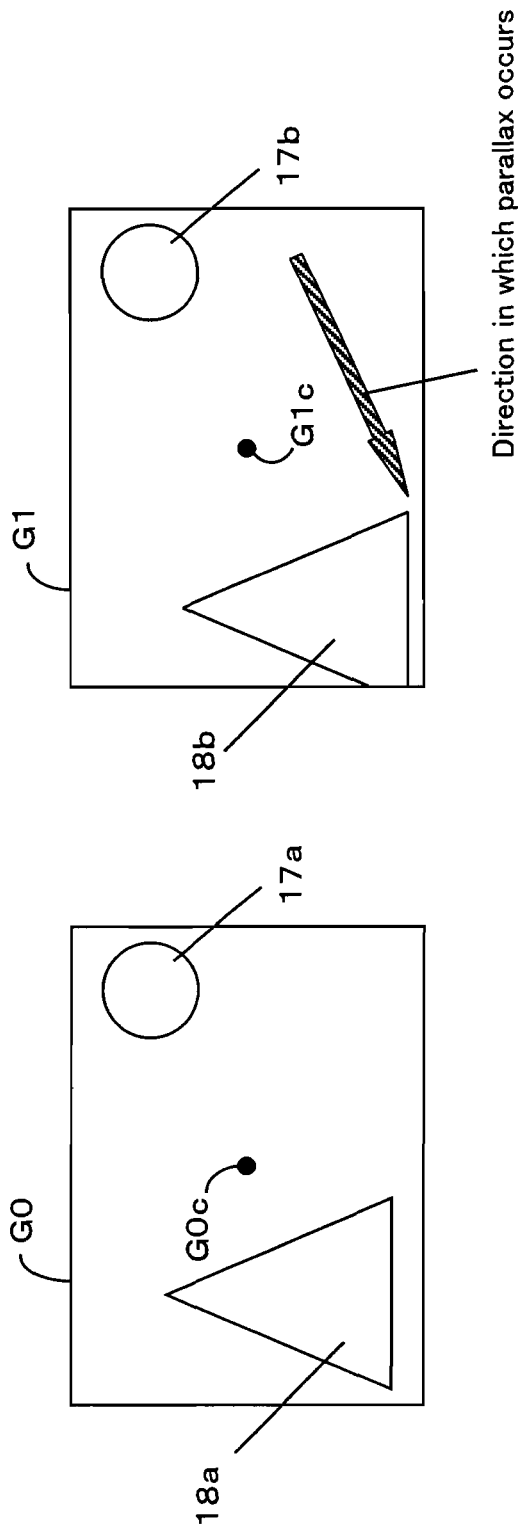
FIG. 2 is a schematic diagram of an example in which parallax occurs.

FIG. 2 schematically shows an example in which parallax occurs between the image G0 outputted from the image sensor 5 and the image G1 outputted from the image sensor 7. In FIG. 2, a reference numeral G0c denotes a point on an image at which the optical axis defined by the imaging optical system 1 and the image sensor 5 intersects the image sensor 5, or in other words, the center of the image G0 of the image sensor 5. Likewise, a reference numeral G1c denotes a point on an image at which the optical axis defined by the imaging optical system 3 and the image sensor 7 intersects the image sensor 7, or in other words, the center of the image G1 of the image sensor 7.

Reference numerals 17a, 18a denote subject images obtained when capturing a subject placed at different distances from the image sensor 5, wherein 17a is an image of a distant object, and 18a is an image of a close object. In addition, reference numerals 17b, 18b denote subject images outputted from the image sensor 7, wherein 17b is an image of a distant object, and 18b is an image of a close object. Note that 17a and 17b are the images of the same object, and 18a and 18b are also the images of the same object.

As can be seen from FIG. 2, there is almost no parallax between the distant object image 17a and the distant object image 17b, and these images are reproduced as images in almost the same position in the respective images G0 and G1 of the image sensors 5 and 7. On the other hand, there is large parallax between the close object image 18a and the close object image 18b. Accordingly, there is the possibility that the close object image 18b may be reproduced as an image in which a part of the image information has been omitted, as shown in FIG. 2. Note that the parallax of the close object image 18b within the image G1 of the image sensor 7 relative to the close object image 18a within the reference image G0 of the image sensor 5 occurs in the direction of a vector extending from the point at which the optical axis of the imaging optical system 3 intersects the image sensor 7 to the point at which the optical axis of the imaging optical system 1 intersects the image sensor 5, when the subject direction is viewed from the image sensor side. With the imaging device of this embodiment, even if color information extracted from the images obtained by the sensors 5 to 8 in which parallax occur are used, a composite image that does not include a false color can be obtained, as will be described below.

Figure 3:
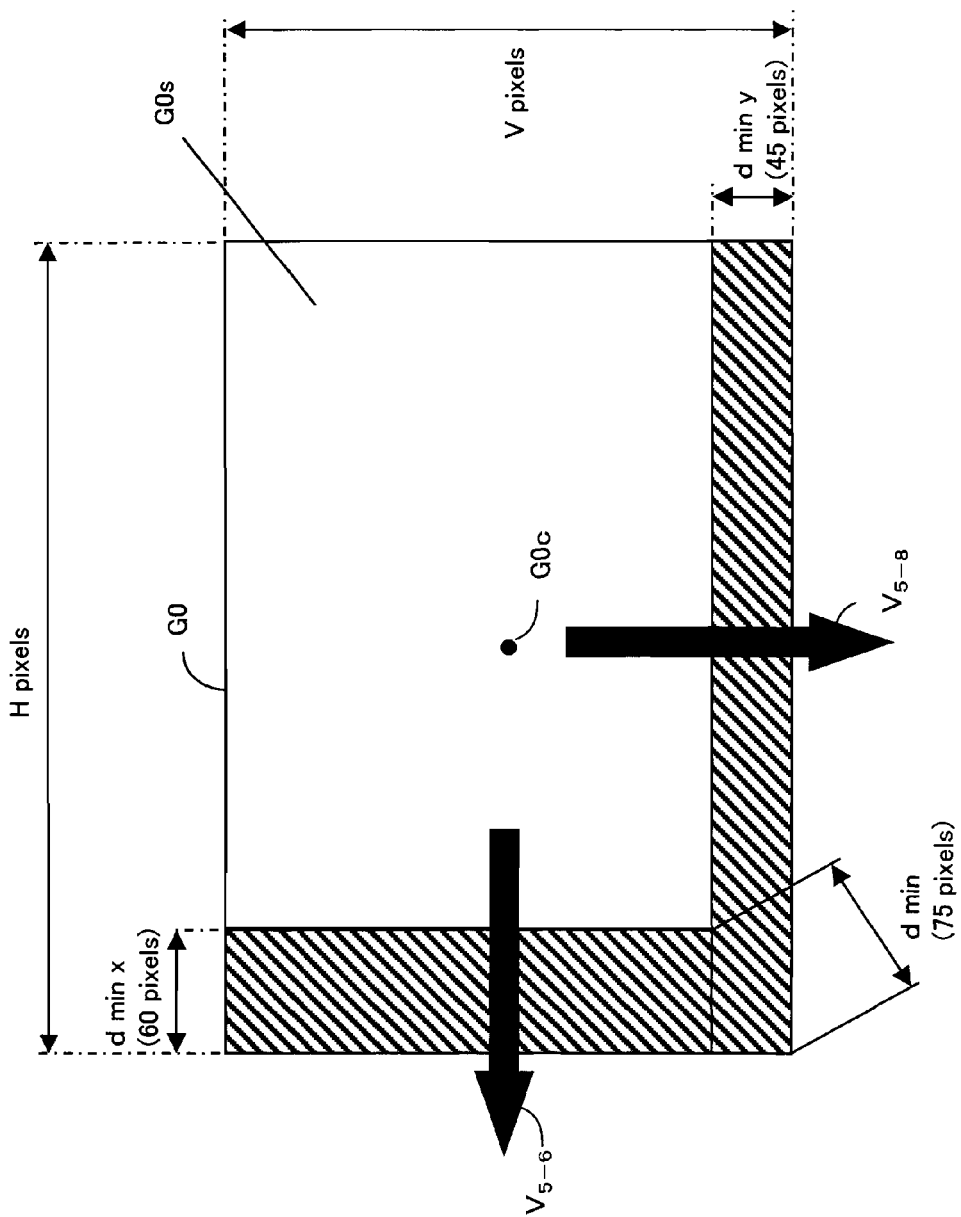
FIG. 3 is a schematic diagram showing a configuration that does not cause omission of color information.

The principle by which the imaging device of this embodiment does not cause omission of color information shall be described with reference to FIG. 3. FIG. 3 shows a subject image outputted from the image sensor 5. The shaded area in FIG. 3 is a region in which, when an object located at the shortest subject distance is imaged in this shaded area of the reference image when using an image outputted from the image sensor 5 as a reference image, the image of that object will be partly omitted from the image sensor 7 due to parallax (hereinafter, referred to as a "displacement region"). Therefore, when an object located at the shortest subject distance is imaged in the displacement region shown in FIG. 3, there is the possibility that the color information of this displacement region may be omitted. Similarly, due to the parallax with the image outputted from the image sensor 5, the displacement region is also present for each of the images outputted from the image sensor 6 and the image outputted from the image sensor 8. For this reason, with the imaging device of this embodiment, the image combining circuit 16 combines the images obtained by the image sensors 5 to 8 into a single image only for the effective pixel region obtained by deleting the pixel information in this displacement region from the reference image at the effective pixel region correcting circuit 13.

The position and range of the region whose pixel information is to be deleted is determined by the position relationship between the imaging optical systems 1 to 4 and the image sensors 5 to 8. In this embodiment, a composite image is formed after deleting the pixels located on the two sides of the reference image G0 in an L-shape, as shown in FIG. 3. In addition, $V_{5-6}$ shown in FIG. 3 denotes the direction of parallax of the image outputted from the image sensor 6 relative to the reference image G0 outputted from the image sensor 5, and $V_{5-8}$ denotes the direction of parallax of the image outputted from the image sensor 8, relative to the reference image G0 outputted from the image sensor 5.

Further, in this embodiment, the size of the region whose pixels are to be deleted at the effective pixel region correcting circuit 13 (displacement region) is determined by the shortest subject distance. The "shortest subject distance" refers to the distance to the closest subject, allowable by the design of the imaging device. The size of the displacement region can be determined, for example, in the following manner. When A min is the shortest subject distance, f is the focal length of the imaging optical systems 1 to 4, D is the distance between the optical axes of the imaging optical system 1 and the imaging optical system 3, and p is the pixel pitch of the image sensors 5 to 8, the parallax amount d min between the image G0 outputted from the image sensor 5 and the image G1 outputted from the image sensor 7 of the subject located at the shortest subject distance A min can be given by Expression (2) below. Although Expression (2) is an approximate expression that holds when the condition of Expression (1) is satisfied, there is no harm in using the approximate expression since the shortest subject distance A min is generally more than ten times the focal length f.

$$A\ min \gg f \tag{1}$$

$$d\ min \approx D \cdot f/(A\ min \cdot p) \tag{2}$$

When d min x is the x-direction component of the parallax amount d min, and d min y is the y-direction component thereof, they can be represented by Expressions (3) and (4).

$$d\min x = d\min \cdot \cos \theta \quad (3)$$

$$d\min y = d\min \cdot \sin \theta \quad (4)$$

Specific numerical examples of the specifications of the imaging device according to this embodiment of the invention include the following, but there is no limitation to these specific values.

D=5 mm
f=4.5 mm
A min=10 cm
p=3 μm
cos θ=⅘
sin θ=⅗

In this case, the parallax amounts d min, d min x, and d min y when images of the subject at the shortest subject distance are captured will be 75 pixels, 60 pixels, and 45 pixels, respectively (see FIG. 3). Accordingly, in this case, the image combining circuit 13 deletes, from the reference image G0, 60 pixels along the side of the positive direction of $V_{5-6}$, and 45 pixels along the side of the positive direction of $V_{5-8}$ in an L-shape, thereby generating a rectangular composite image consisting of (H-60) pixels in the horizontal direction and (V-45) pixels in the vertical direction.

As described above, with the imaging device according to this embodiment, the image information of a region in which there may be omission of the color information (displacement region) is discarded at the effective pixel region correcting circuit 13, and the image combining circuit 16 generates a color composite image by using only the image information of a region in which the color information is complete (the region $G0_S$ shown in FIG. 3). Hereinafter, the region $G0_S$ is referred to as the "output pixel region".

Figure 4:
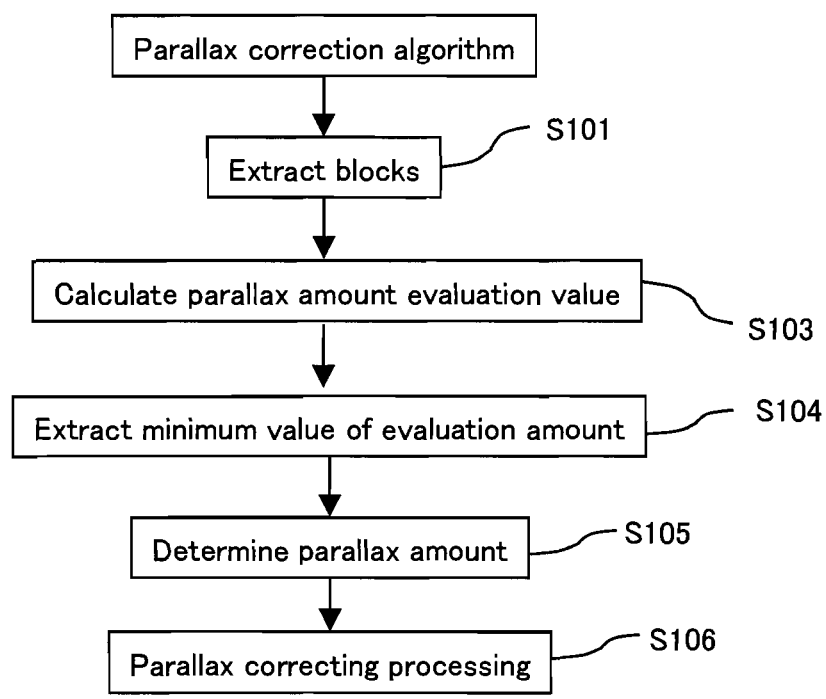
FIG. 4 is a chart illustrating the basic flow of a parallax correction algorithm.
Figure 5:
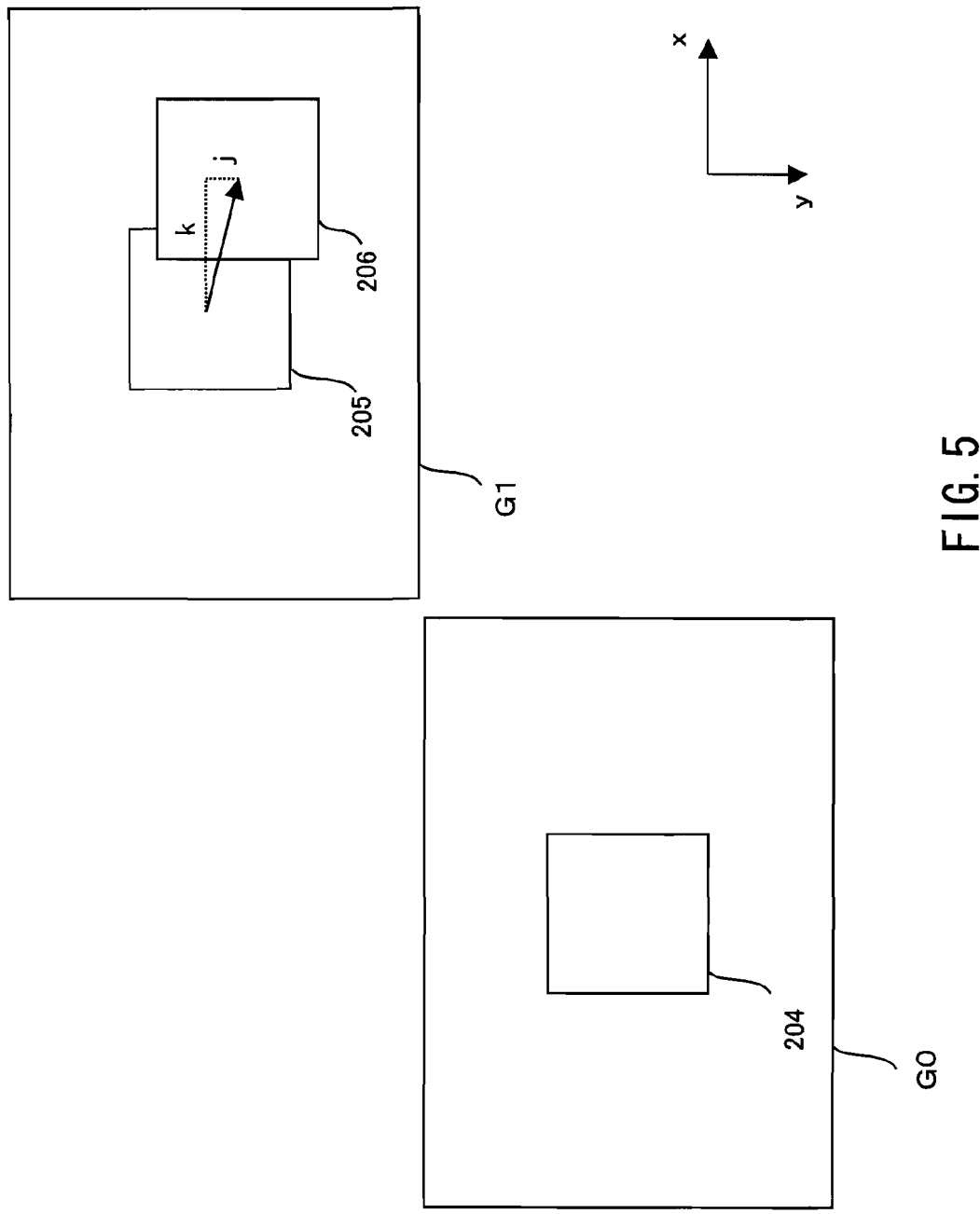
FIG. 5 is a diagram showing detection blocks.

Next, the extraction of the parallax amount of the output pixel region $G0_S$ in FIG. 3 shall be described with reference to FIGS. 4 and 5. FIG. 4 is a chart showing the basic flow of a parallax correction algorithm. FIG. 5 is a diagram showing detection blocks on the image sensors 5 and 7.

In step S101 of the parallax correction algorithm, block extraction processing is performed. Here, the output pixel region $G0_S$ of the image sensor 5 is divided into uniform blocks first. Although the following describes the processing of one (first detection block 204) of the blocks, the same processing is performed for all the divided blocks. A suitable size of the first detection block 204 is approximately 8×8 pixels to approximately 64×64 pixels. In the case where the magnification of the imaging optical system is increased, it is preferable to reduce the pixel size of the detection block 204. In addition, a second detection block 205 having the same size as the first detection block 204 is set on the image G1.

Next, in step S103, the parallax amount evaluation value is calculated in order to locate the block having the same image information as the first detection block 204 of the reference image G0 in the image G1. A specific example of the process of calculating the parallax amount evaluation value shall be described below. In FIG. 5, when the second detection block 205 set on the image G1 in step S101 is displaced by k pixels in the x-axis direction, and by j pixels in the y-axis direction, the second detection block is displaced to the position indicated by 206. Then, the difference between the output values of the corresponding pixels within the first detection block 204 and the displaced second detection block 206 is calculated. The calculated difference is summed for all the pixels within the detection blocks, and used as the parallax amount evaluation value at the position of the second detection block 206. Note that the method for calculating the parallax amount evaluation value is not limited to this.

When GG1 (a, b) is the output value from the pixels in the pixels (a, b) within the first detection block 204, and GG2 (a, b) is the output value from the pixels in the pixels (a, b) within the second detection block 206, the parallax amount evaluation value R (k, j) can be obtained by Expression (5) below.

$$R(k, j) = \sum_a \sum_b |GG1(a, b) - GG2(a+k, b+j)| \quad (5)$$

The parallax amount evaluation value R(k, j) indicates the magnitude of correlation between the second detection block 206 displaced by the parallax amount (k, j) and the first detection block 204, and the smaller this value is, the higher the similarity between the two detection blocks is.

Figure 6:
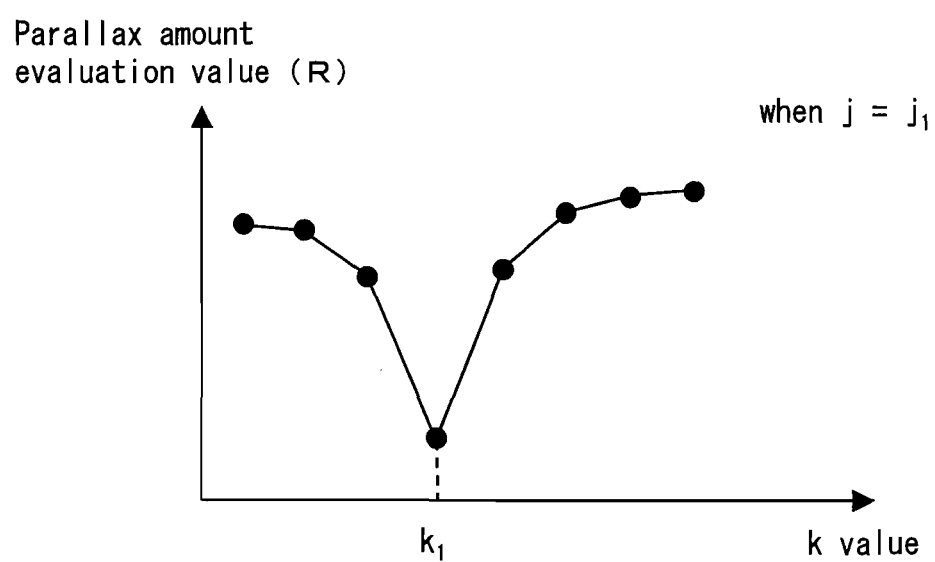
FIG. 6 is a graph showing the relationship between the parallax amount evaluation values and the parallax amount of a second detection block.

FIG. 6 shows the relationship between the parallax amount evaluation value and the parallax amount of the second detection block. In FIG. 6, the number of pixels (k) displaced in the x direction is plotted on the horizontal axis, and the parallax amount evaluation value (R) is plotted on the vertical axis. The parallax amount evaluation value increases with the value of k, and significantly decreases when the level of similarity is high. In FIG. 6, this value is minimum when $k=k_1$. Although FIG. 6 shows the case where only the value of k is changed while the value of j is fixed such that $j=j_1$, the same change also occurs in the case where the value of j is changed. Therefore, in the calculating process of the parallax amount evaluation value in step S103, the process is repeatedly performed for all the possible values of k and j in a predetermined range. Usually, the direction in which parallax occurs is uniquely determined by the positional relationship between the image sensor 5 to 8. Accordingly, by performing extraction of the second detection block during calculation of the block parallax amount evaluation value in accordance with such a principle, the calculation efficiency can be significantly improved.

Next, in step S104, the minimum value is extracted from the parallax amount evaluation values obtained in step S103. Here, the calculation results of the parallax amount evaluation values obtained using the above-described algorithm are compared, and their minimum value is obtained. Then, in step S105, the parallax amount (k, j) at the time when the minimum value is obtained is extracted, and the parallax amount is determined. Provided that the minimum value is obtained when $k=k_1$ and $j=j_1$, the image information of the first detection block 204 on the reference image G0 is determined to match the image information of the second detection block 206 on the image G1 at the time when the second detection block 206 is displaced by $k_1$ pixels in the x direction, and $j_1$ pixels in the y direction, and the parallax amount $(k_1, j_1)$ is extracted, and used as the parallax amount of the first detection block 204 ($dx=k_1$, $dy=j_1$). This series of processing is performed for all the detection blocks set in the output pixel region $G0_S$ within the reference image G0 of the image sensor 5, and thereby the parallax amount is determined. By the parallax computing circuit 14 performing the above-described processing, the parallax amount of the image G1 relative to the reference image G0 can be obtained.

Then, the parallax amount of the image R outputted from the image sensor 6, and the parallax amount of the image B outputted from the image sensor 8 are calculated based on the parallax amount obtained for the image G1 outputted from the image sensor 7. The image combining circuit 16 corrects each of the images, and superimpose them on the reference image G0, thereby generating a color composite image. Note that, in the imaging device of this embodiment, all the information of the pixels corresponding to the displacement region on the reference image G0 has been discarded by the effective pixel region correcting circuit 13 prior to the generation of a composite image.

With the configuration of this embodiment, it is possible to improve the conventional problem of a false color at the periphery in a compound eye optical system in which parallax occurs for each color information.

This embodiment has been described with respect to the configuration using four image sensors. However, it should be emphasized that the present invention is not limited to such a configuration, and provides the same effect when using a single image sensor divided into four imaging regions, or using two image sensors each divided into two imaging regions.

Figure 7:
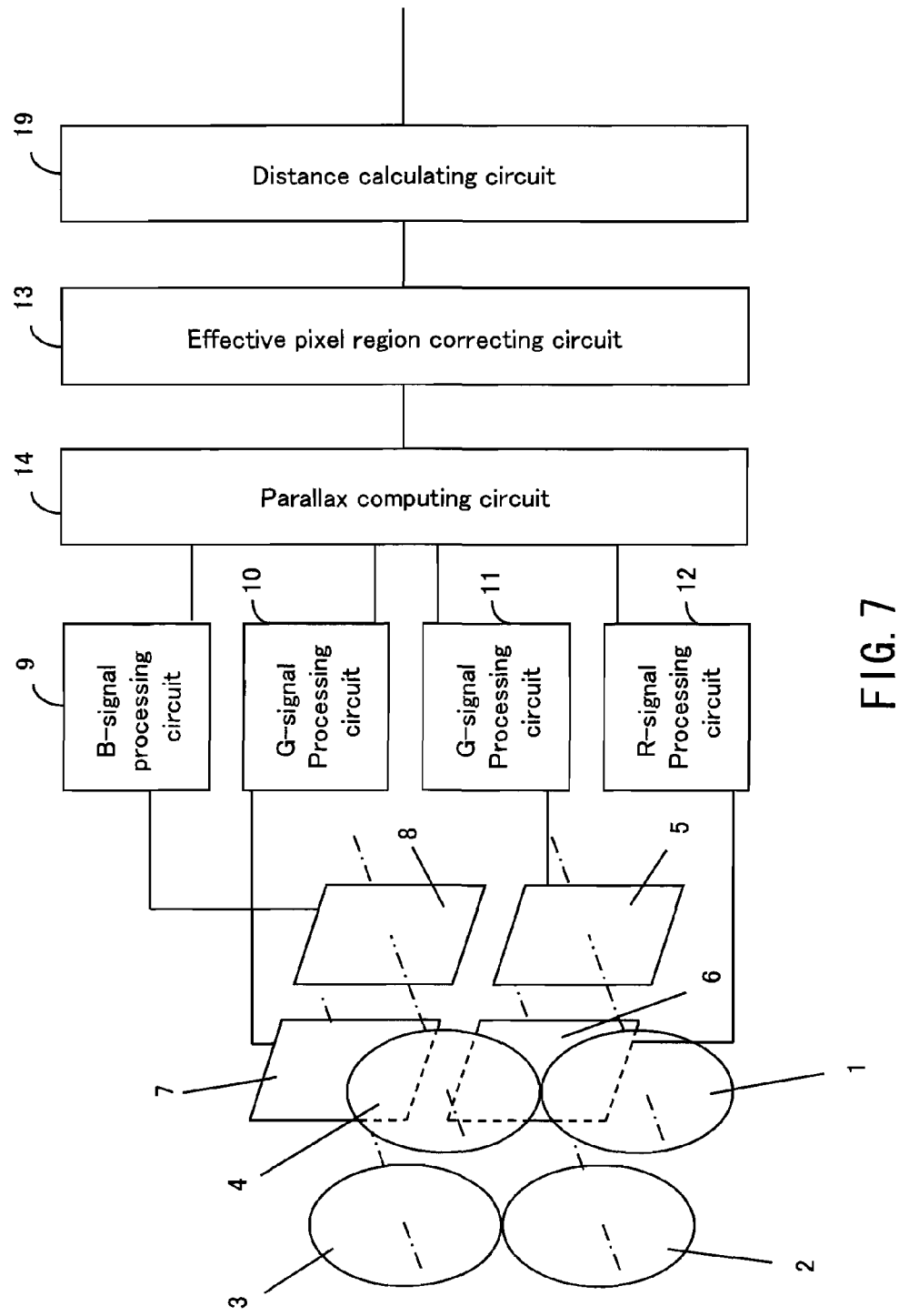
FIG. 7 is a block diagram schematically showing the configuration of a modification of the imaging device according to the first embodiment of the present invention.

Furthermore, also with an imaging device in which parallax is extracted from multiple sets of images of the same wavelength band, and the distance to a subject is measured based on the extracted parallax, the conventional problem that a portion whose distance cannot be measured is generated at the periphery of an image can be solved by discarding the information of the pixels corresponding to the displacement region as in this embodiment. The processes of generating a color image by combining images obtained by multiple imaging regions and of measuring the distance to a subject using images obtained by multiple imaging regions (distance measuring process), as described above in this embodiment, are common in that these processes are performed based on the parallax amounts extracted from the images. Therefore, the conventional problem that a portion whose distance cannot be measured is generated at the periphery of an image also can be solved by applying this embodiment to the distance measuring process. An imaging device that performs distance measuring processing readily can be formed, for example, by providing a distance calculating circuit 19 that calculates the distance to a subject based on the parallax extracted from the images of the image sensor 5 and 7 in place of the image combining circuit 16 of the configuration of FIG. 1, as shown in FIG. 7. In addition, an imaging device capable of performing both the color image outputting process and the distance measuring process by including both the image combining circuit 16 and the distance calculating circuit 19 is also an embodiment of the present invention.

When using the imaging device according to this embodiment as a distance measuring device, once the parallax amount d in two optical systems has been obtained by the parallax computing circuit 14, the distance calculating circuit 19 can obtain the distance z to the subject using Expression (6). In Expression 6, D is the distance between the optical axes of the two optical systems, f is the focal length of the optical systems, d is the parallax amount, and z is the subject distance.

$$z \approx D \cdot f / d \quad (6)$$

It should emphasized that the imaging device that measures a distance may not need to include four imaging regions, and the distance measurement can be sufficiently performed if at least two imaging regions are provided.

Second Embodiment

Hereinafter, a second embodiment of the present invention shall be described with reference to the drawings.

In the first embodiment described above, a region in which the color information of an image may be partly omitted (displacement region) is determined based on the shortest subject distance, and all the pixel information of the displacement region is discarded when generating a composite image. In contrast, in the second embodiment described below, a portion where the color information of an image will be actually omitted and a portion where the color information will not be actually omitted in the displacement region are determined, and the pixels of the portion where the color information will not be omitted are outputted as an image during image combination. That is, whereas the number of pixels outputted as an image (the number of pixels of the output pixel region) is reduced in the first embodiment, the reduction in the number of pixel can be suppressed in the second embodiment.

Figure 8:
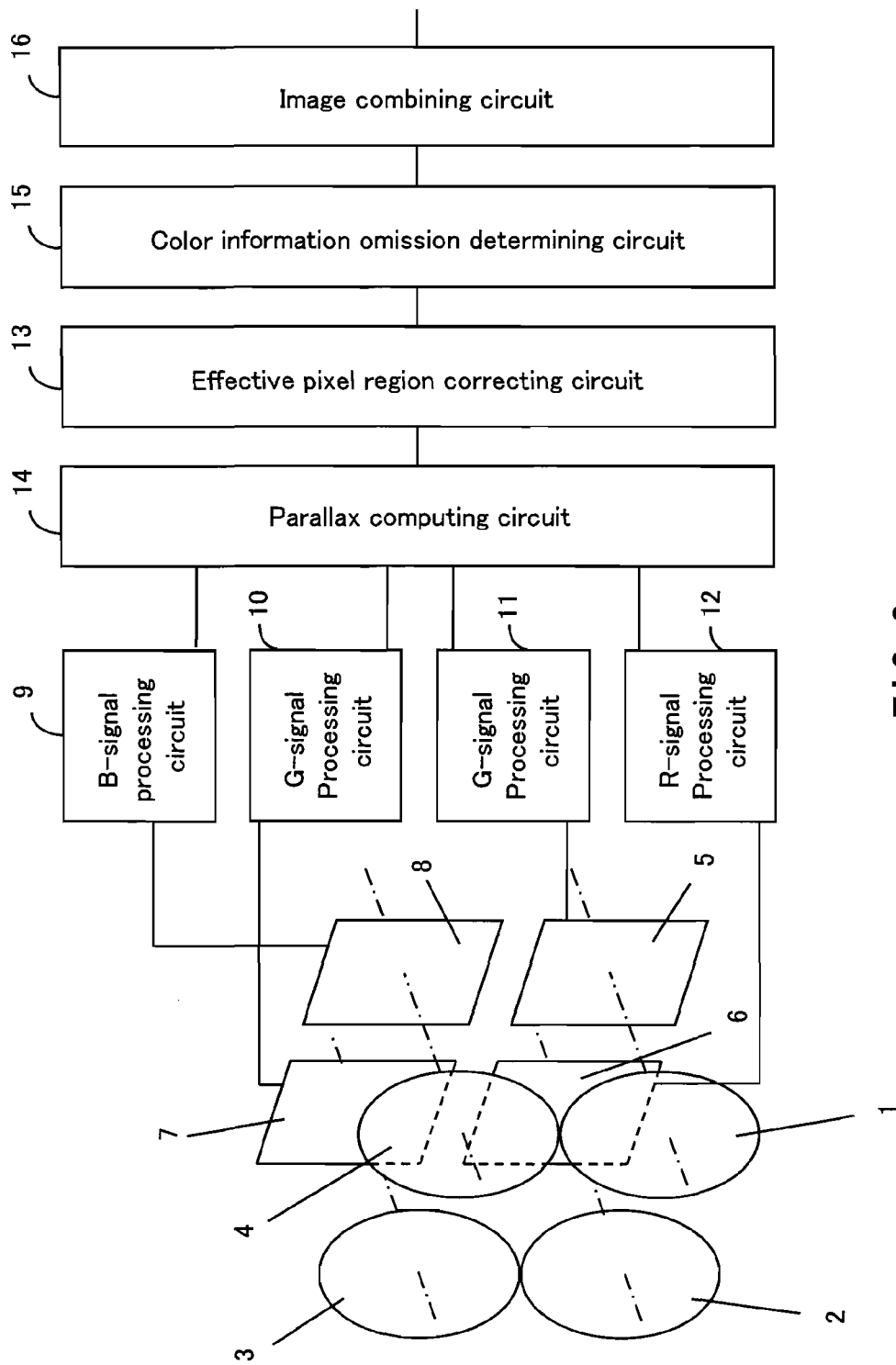
FIG. 8 is a block diagram schematically showing the configuration of the imaging device according to a second embodiment of the present invention.

Therefore, as shown in FIG. 8, an imaging device according to the second embodiment includes a color information omission determining circuit 15 in addition to the components described in the first embodiment.

Figure 9:
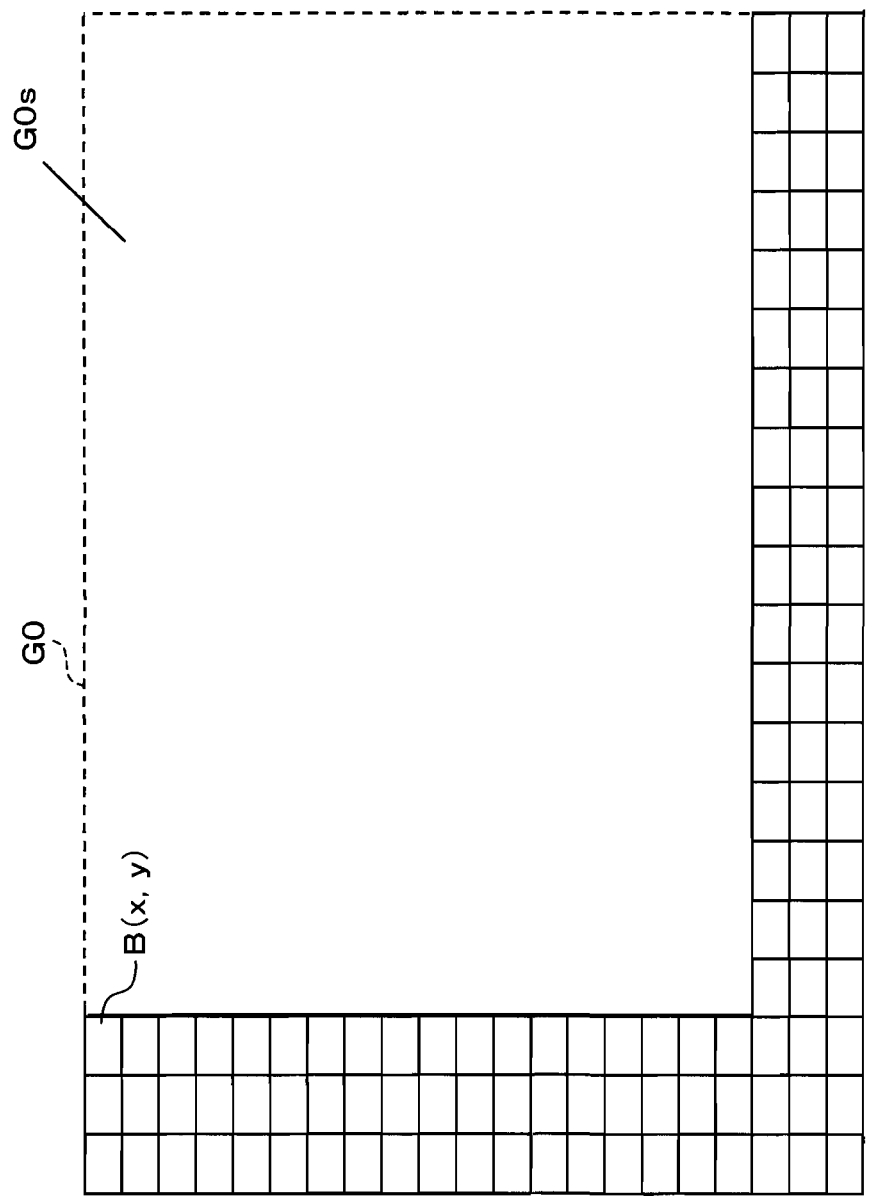
FIG. 9 is a diagram showing a state in which a displacement region is divided into blocks with a suitable size in the imaging device according to the second embodiment of the present invention.
Figure 10:
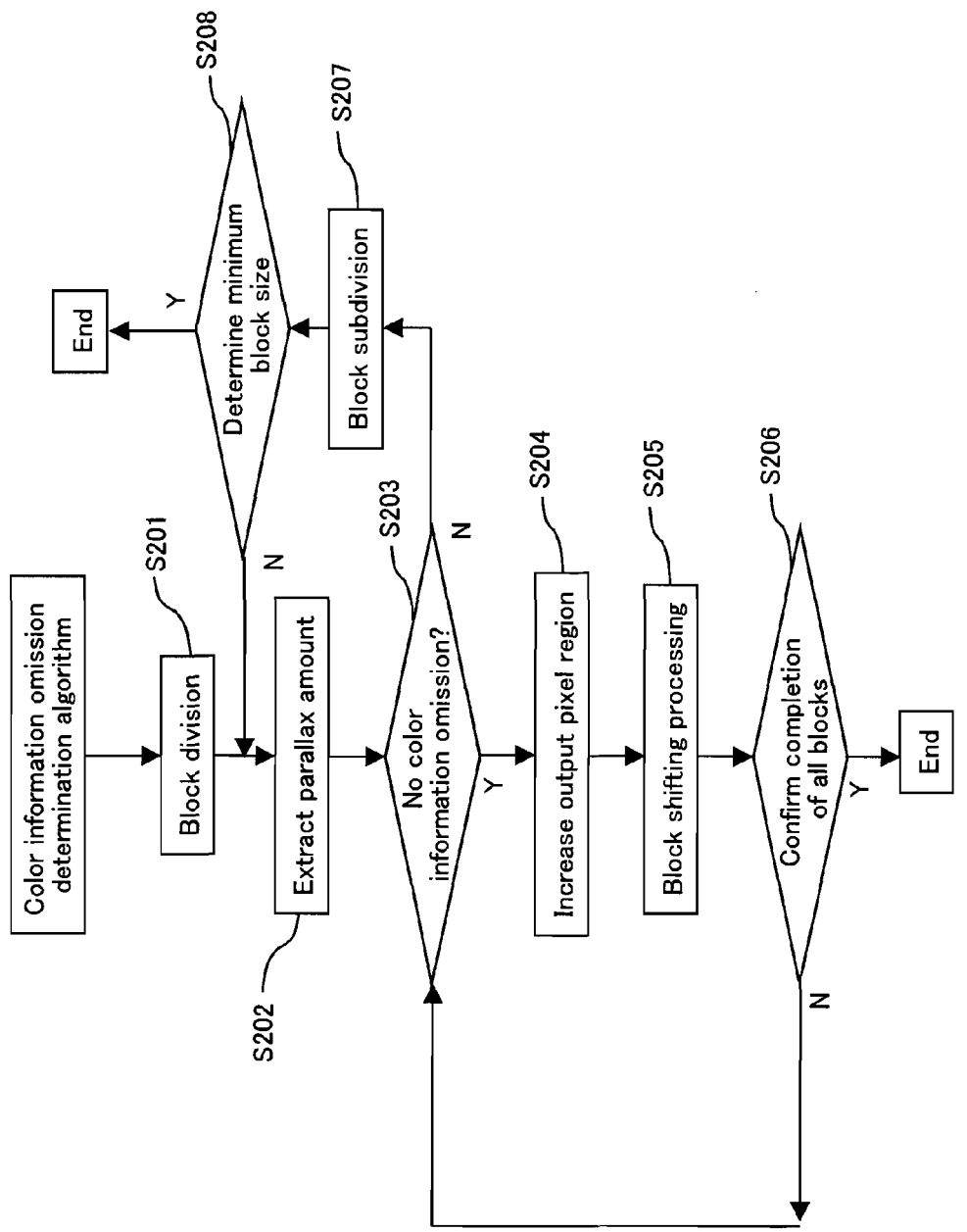
FIG. 10 is a chart illustrating the flow of a color information omission determination algorithm.

FIG. 9 is a diagram showing a state in which the displacement region in the reference image G0 outputted from the image sensor 5 is divided into blocks having a suitable size. FIG. 10 is a chart showing the flow of a color information omission determination algorithm.

In step S201 of FIG. 10, the displacement region is divided into rectangular blocks B (x, y) having a suitable size, as shown in FIG. 9. Here, (x, y) represents the coordinates of a representative point (e.g., a central point) of each of the blocks. In general, a suitable block size is approximately 8 pixels×8 pixels to approximately 64 pixels×64 pixels. Next, in step S202, parallax extraction is performed by executing steps S103 to S105 of the parallax correction algorithm shown in FIG. 4, thereby extracting the parallax amount of all the blocks B divided in step S201.

Figure 11:
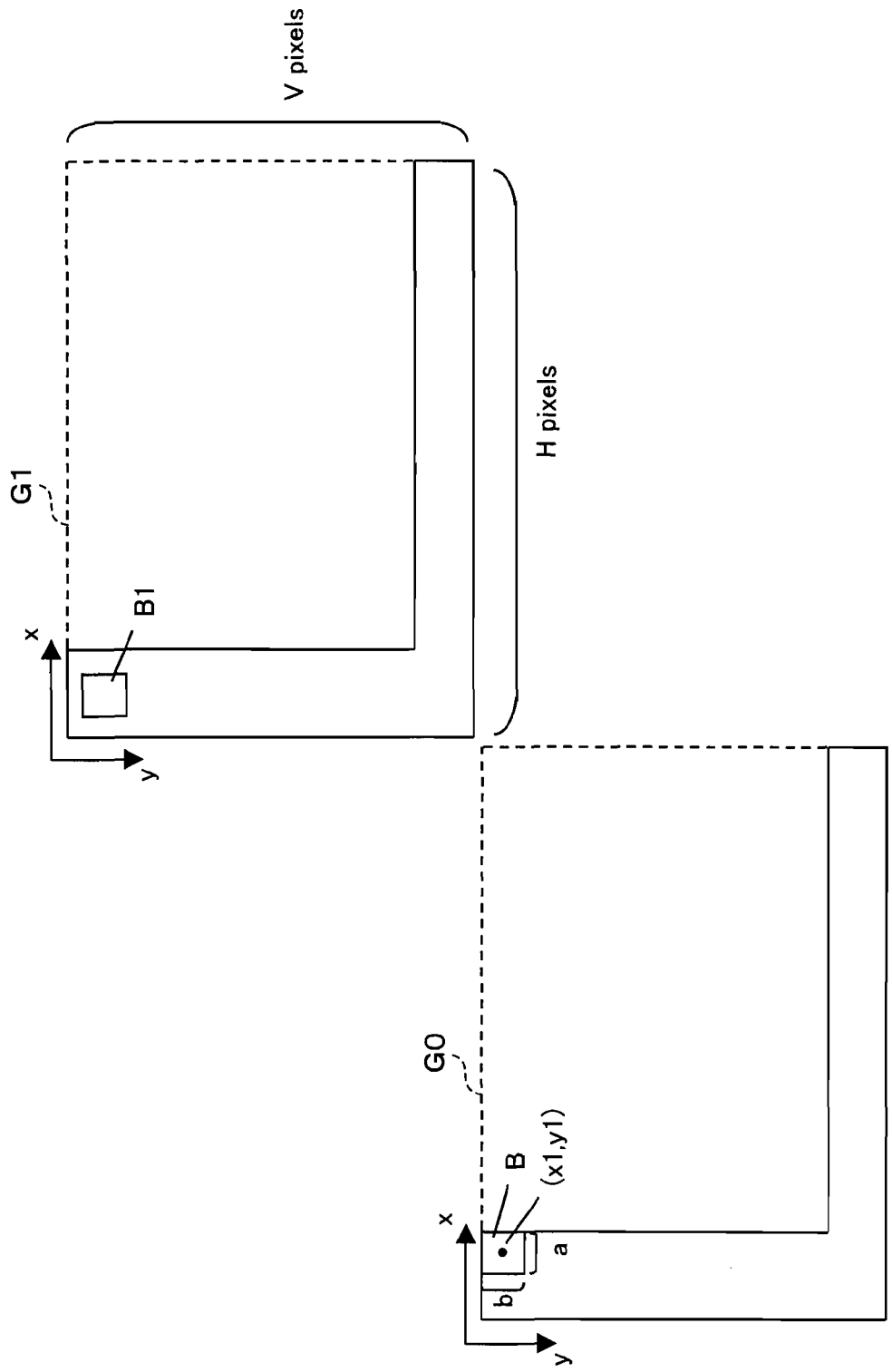
FIG. 11 is a diagram illustrating a method for determining color information omission.

Further, in step S203, whether or not the color information will be actually omitted during image generation is determined for each of the blocks B. Here, a specific example of this determination shall be described with reference to FIG. 11. In FIG. 11, images G0 and G1 obtained from the image sensors 5 and 7 have H pixels in the x direction and V pixels in the y direction. Block B (x1, y1) in the displacement region on the image G0 is an "a" pixels×"b" pixels block that has been determined as the block corresponding to block B1 on the image G1 as a result of extracting the parallax amount in step S201, and the parallax amount of the block B is (k, j). Here, if the block B1 satisfies the conditions present in the image G1, then it is determined that the block B will actually have no omission of the color information during image combination. When this is described in mathematical expressions, Expressions (7) and (8) are given.

$$x1+k-a/2 \geq 0 \quad (7)$$

$$y1+j+b/2 \leq V \quad (8)$$

In step S203, the color information omission determining circuit 15 determines whether or not the above conditions are satisfied for each of the blocks. If the conditions are satisfied (the result of step S203 is "Y"), then the block B is added to the output pixel region $G0_S$, and thereby increasing the output pixel region determined by the effective pixel region correcting circuit 13 (step S204). Then, the block for which the above-described condition determination is performed is shifted by one (step S205), and the procedure returns to step S203.

Figure 12:
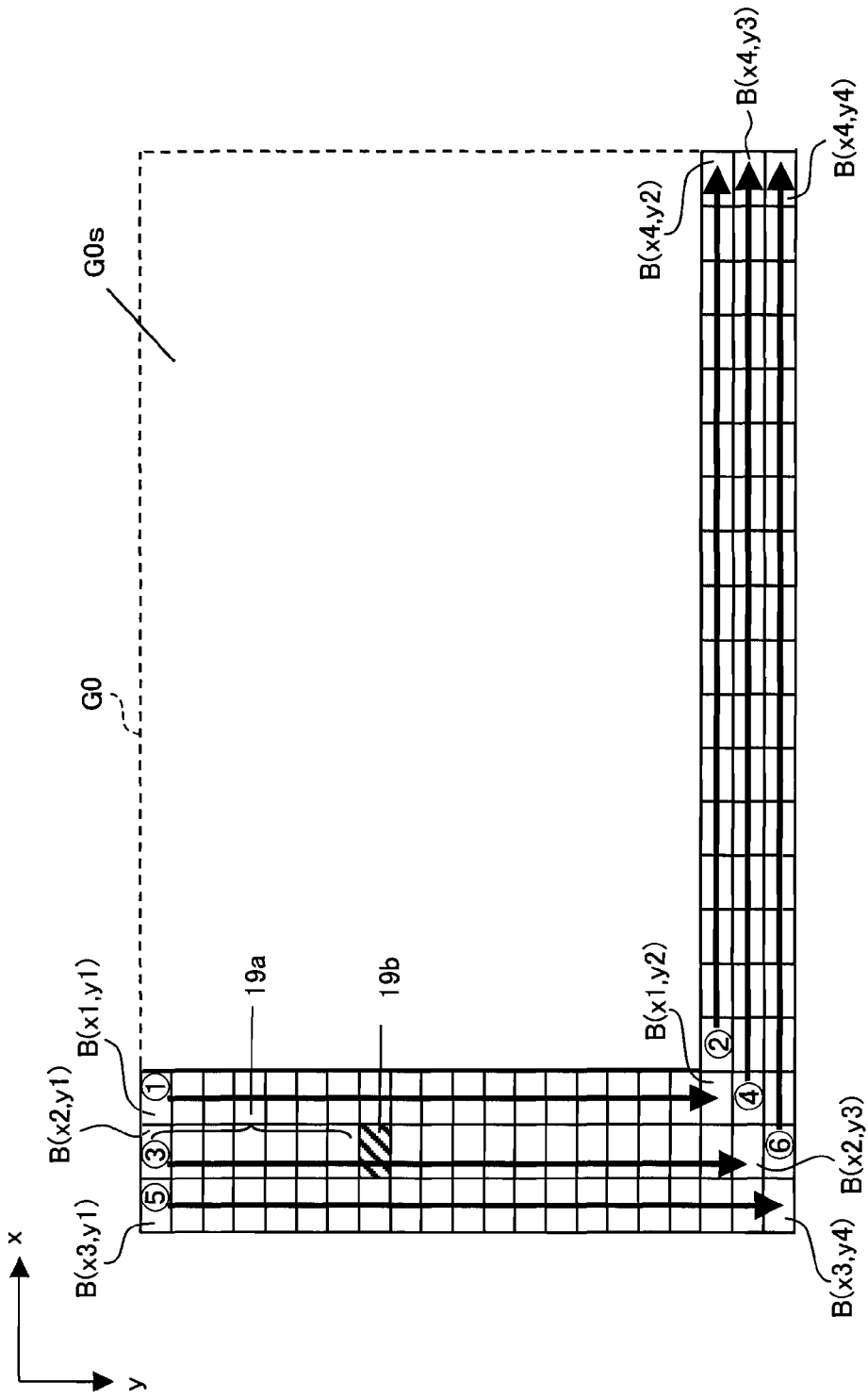
FIG. 12 is a diagram illustrating the process of increasing an output pixel region in the imaging device according to the second embodiment of the present invention.

As such, as long as the result of step S203 is "Y", the output pixel region is increased by one block in step S204, and in step S205, the processing in step S203 to S205 is continuously repeated while sequentially shifting the block for which the condition determination is performed, starting with the block in contact with the perimeter of the output pixel region $G0_S$ to the blocks located outside thereof, for example, as shown by the arrows marked by 1) to 6) in FIG. 12. That is, the processing is started with the block B (x1, y1) shown in FIG. 12, and in a period during which the result of step S203 is "Y", the block for which the condition determination is performed is sequentially shifted along the arrow 1) (i.e., along the perimeter of the output pixel region $G0_S$) in the direction in which the y coordinate increases. Upon reaching block B (x1, y2), the block for which the condition determination is performed is then sequentially shifted along the arrow 2) in the direction in which the x coordinate increases. Then, upon reaching block B (x4, y2) shown in FIG. 12, the block for which the condition determination is performed is shifted to block B (x2, y1). After this, similarly, the block for which the condition determination is performed is sequentially shifted from the block B (x2, y1) to block B (x2, y3) along the arrow 3), then from the block B (x2, y3) to block B (x4, y3) along the arrow 4), then from block B (x3, y1) to block B (x3, y4) along the arrow 5), and then from the block B (x3, y4) to block B (x4, y4) along the arrow 6).

However, if the result of step S203 is "N", then the procedure moves to step S207. The determination result in step S203 is "N", for example, in the case where, during processing the blocks along the arrow 3) in FIG. 12, block group 19a satisfies the above-described conditions, but block 19b does not satisfy the conditions. In this case, in step S207, the procedure returns to the first block of the blocks indicated by the arrow 3) shown in FIG. 12, and the block group indicated by that arrow is subdivided, and the processing in S202 and S203 is executed again on the subdivided blocks. If the determination result in step S203 is still "N" even after repeatedly subdividing the blocks into a block size of approximately 2×2 pixels in step S207, then it is determined that the output pixel region $G0_S$ cannot be increased further, and the process ends.

Although FIG. 12 shows an example in which the processing is started with the block B (x1, y1), the processing may be started with the block B (x4, y2), and the block to be processed may be shifted in the direction backward to the arrow 2).

By performing the above-described processing, the imaging device of this embodiment is advantageous in that the output pixel region can be made larger than that of the first embodiment in a compound eye optical system in which parallax occurs for each color information, in addition to that the problem of a false color at the periphery being improved.

This embodiment has been described with respect to the configuration using four image sensors. However, it should be emphasized that the present invention is not limited to such a configuration, and provides the same effect when using a single image sensor divided into four imaging regions, or using two image sensors each divided into two imaging regions.

Furthermore, also with an imaging device in which parallax is extracted from multiple sets of images of the same wavelength band, and the distance to a subject is measured based on the extracted parallax, the conventional problem that a portion whose distance cannot be measured is generated at the periphery of an image can be solved by discarding the information of the pixels corresponding to the displacement region as in this embodiment. The processes of generating a color image by combining images obtained by multiple imaging regions and of measuring the distance to a subject using images obtained by multiple imaging regions (distance measuring process), as described above in this embodiment, are common in that these processes are performed based on the parallax amounts extracted from the images. Therefore, the conventional problem that a portion whose distance cannot be measured is generated at the periphery of an image also can be solved for the distance measuring process by applying this embodiment. An imaging device that performs distance measuring processing readily can be formed, for example, by providing a distance calculating circuit 19 that calculates the distance to a subject based on the parallax extracted from the images of the image sensor 5 and 7 in place of the image combining circuit 16 of the configuration of FIG. 1, as shown in FIG. 7. In addition, an imaging device capable of performing both the color image outputting process and the distance measuring process by including both the image combining circuit 16 and the distance calculating circuit 19 is also an embodiment of the present invention.

Once the parallax amount d in two optical systems has been obtained, the distance z to the subject can be determined using Expression (6) above. In addition, it should emphasized that the imaging device that measures a distance may not need to include four imaging regions, and the distance measurement can be sufficiently performed if at least two imaging regions are provided.

Third Embodiment

Hereinafter, a third embodiment of the present invention shall be described with reference to the drawings.

An imaging device according to this embodiment is different from that of the first embodiment in that the number of pixels of an output pixel region can be maximized without the need of complex image processing as in the second embodiment, by providing imaging sensors including imaging regions that are different in size.

Figure 13:
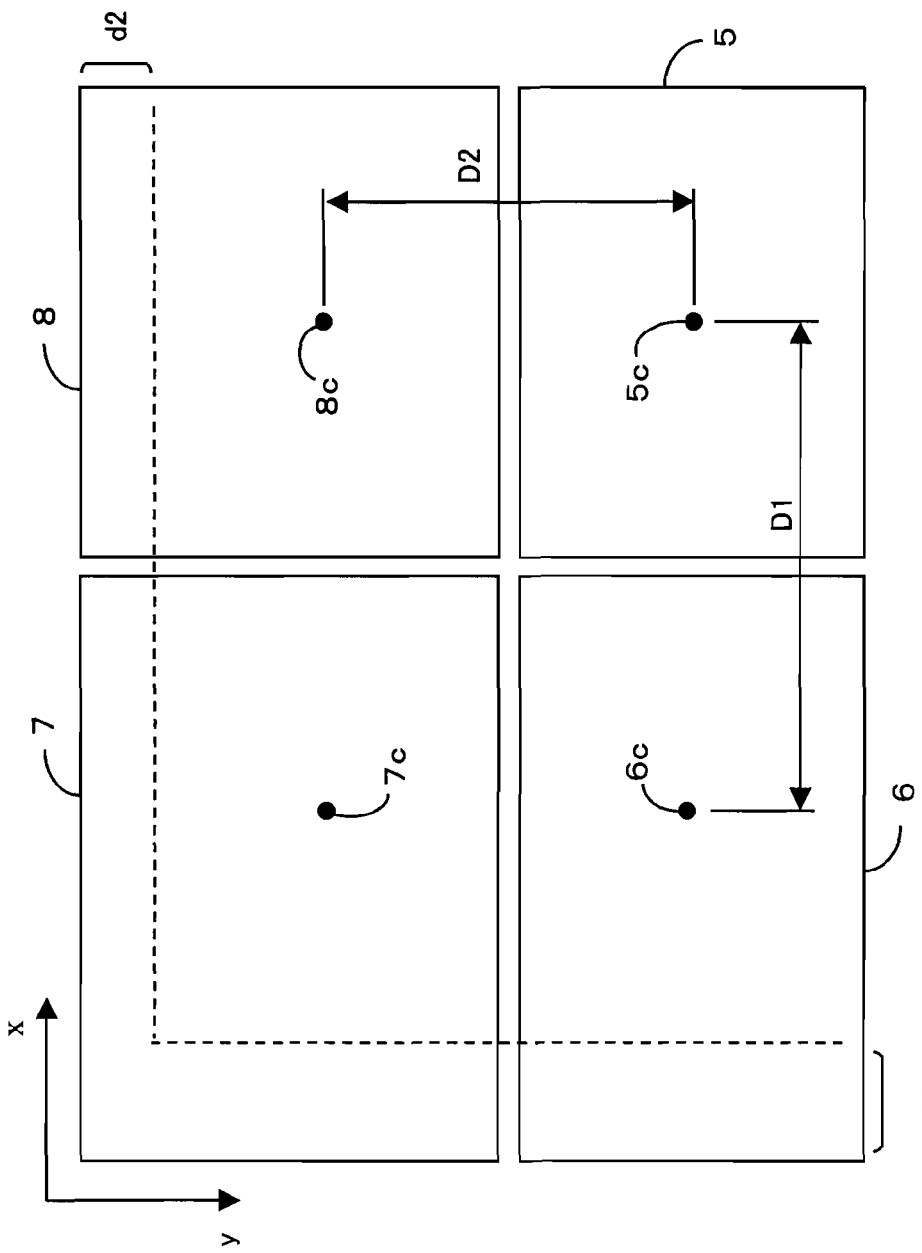
FIG. 13 is a plan view showing the size of image sensors in an imaging device according to a third embodiment of the present invention, as viewed from the imaging optical system side.

FIG. 13 is a plan view showing the sizes of the imaging regions of the image sensors 5 to 8 when the image sensors are viewed from the imaging optical systems 1 to 4 side. Here, the parts that have the same functions as those of the first embodiment or the second embodiment are denoted by the same reference numerals. As in the first embodiment, the image sensor 5 outputs the reference image G0, the image sensor 6 outputs the image R, the image sensor 7 outputs the image G1, and the image sensor 8 outputs the image B.

In FIG. 13, a reference numeral 5c denotes the point at which the optical axis defined by the imaging optical system 1 and the image sensor 5 intersects the light receiving surface of the image sensor 5, a reference numeral 6c denotes the point at which the optical axis defined by the imaging optical system 2 and the image sensor 6 intersects the light receiving surface of the image sensor 6, a reference numeral 7c denotes the point at which the optical axis defined by the imaging optical system 3 and the image sensor 7 intersects the light receiving surface of the image sensor 7, and a reference numeral 8c denotes the point at which the optical axis defined by the imaging optical system 4 and the image sensor 8 intersects the light receiving surface of the image sensor 8. In addition, the broken lines shown in the image sensors 6, 7 and 8 indicate imaging regions having the same size as that of the image sensor 5. D1 is the distance between the point 5c and the point 6c, and D2 is the distance between the point 5c and the point 8c.

As can be seen from FIG. 13, the sizes of the image sensors 5 to 8 of the imaging device of this embodiment are all different. More specifically, the size of the image sensor 5 that outputs the reference image G0 is smallest, and the size of the image sensor 6 is such that the number of pixels is increased by d1 in the negative x direction, as compared with the image sensor 5. The size of the image sensor 8 is such that the number of pixels is increased by d2 in the negative y direction, as compared with the image sensor 5. Further, the size of the image sensor 7 is such that the number of pixels is increased by d1 in the negative x direction, and increased by d2 in the negative y direction direction, as compared with the image sensor 5.

When A min is the shortest subject distance, f is the focal length of the imaging optical systems 1 to 4, and p is the pixel pitch of the image sensors 5 to 8, the amount of pixel increase in the x direction d1 and the amount of pixel increase in the y direction d2 can be represented by Expressions (9) and (10) based on the assumption of Expression (1) above.

$$d1 \approx D1 \cdot f/(A \min \cdot p) \quad (9)$$

$$d2 \approx D2 \cdot f/(A \min \cdot p) \quad (10)$$

Therefore, when the size of the image sensor 5 is H pixels×V pixels, the size of the image sensor 6 is (H+d1) pixels×V pixels, the size of the image sensor 7 is (H+d1) pixels×(V+d2) pixels, and the size of the image sensor 8 is H pixels×(V+d2) pixels.

Since the image sensor 7 is larger than the image sensor 5 in this configuration, the amount of information comparative to that of the image information of the image sensor 5 can all be extracted from the image sensor 7, even allowing for parallax occurring for the shortest subject distance.

Figure 14:
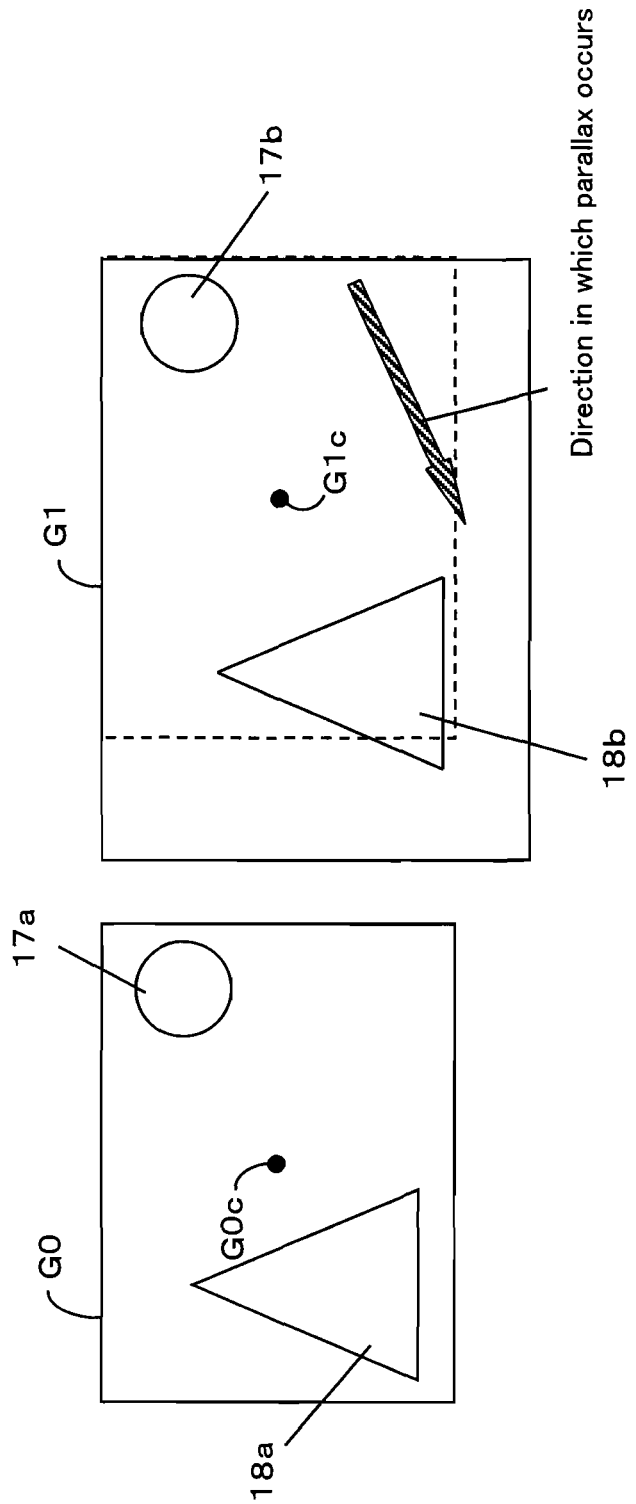
FIG. 14 is a diagram showing the effect of the third embodiment.

More specifically, since the image sensor 7 has a sufficiently large imaging region, close object 18a that has been imaged at the periphery of the image sensor 5 can be formed in the image sensor 7 without any information omission, as shown in FIG. 14. Accordingly, without performing any complex operation process as that in the second embodiment, it is possible to increase the size of the output pixel region relative to the first embodiment, in addition to improving the conventional problem of a false color at the periphery in optical systems in which parallax occurs for each color information. FIG. 13 shows the light receiving surfaces of the image sensors 5 to 8, as viewed from the imaging optical systems 1 to 4 side, and FIG. 14 shows the imaging signals respectively outputted from the image sensors 5 to 8. Therefore, FIG. 13 and FIG. 14 are in a relation of being vertically and horizontally reversed. In addition, the broken line shown in G1 indicates an imaging region having the same size as G0.

This embodiment has been described with respect to the configuration using four image sensors. However, it should be emphasized that the present invention is not limited to such a configuration, and provides the same effect when using a single image sensor divided into four imaging regions, or using two image sensors, each divided into two imaging regions.

Here, a specific configuration example for realizing the above-described embodiment also shall be given. The components described above are denoted by the same reference numerals as those in the above description.

Figure 19:
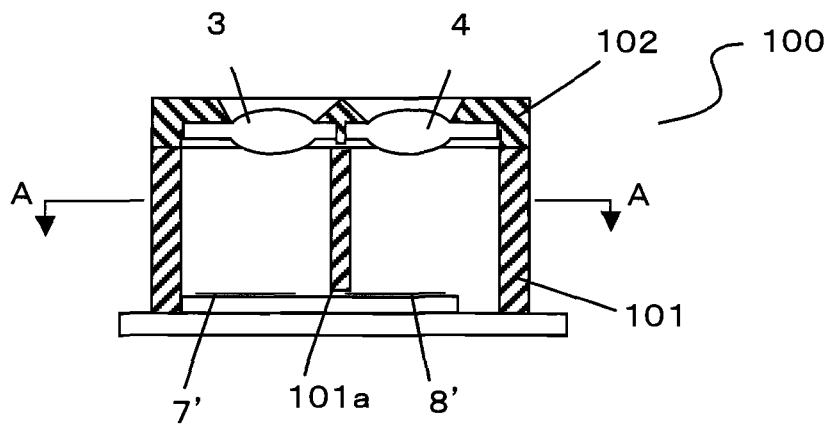
FIG. 19 is a cross-sectional view of an imaging device according to the present invention
Figure 20:
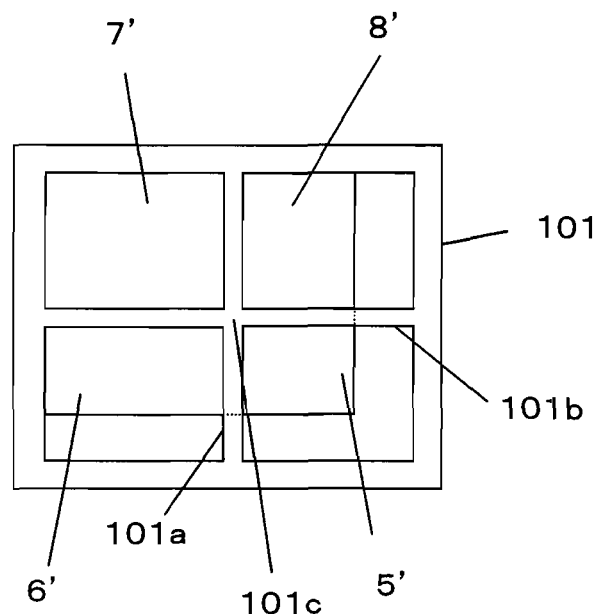
FIG. 20 is a diagram showing an example of the imaging device according to the present invention.

FIG. 19 is a cross-sectional view showing an imaging device 100 according to one configuration example of the present invention. The cross-section shown in FIG. 19 is parallel to the optical axes of the imaging optical systems 1 to 4. FIG. 20 is a cross-sectional view of the imaging device 100 shown in FIG. 19, taken along the line A-A. In FIGS. 19 and 20, a numeral 101 denotes a first lens barrel, and a numeral 102 denotes a second lens barrel that holds the imaging optical systems 1 to 4. As shown in FIG. 20, the first lens barrel 101 has inner walls 101a and 101b that are orthogonal to each other. The inner walls 101a and 101b divide a single image sensor into four imaging regions, thereby realizing image areas 5' to 8', which function as the image sensors 5 to 8 described above (see FIG. 20).

In the configuration shown in FIG. 20, the inner walls 101a and 101b of the first lens barrel 101 intersect each other approximately at the central position of the first lens barrel 101, thereby dividing the inner walls of the lens barrel into four regions having substantially the same volume. In other words, the first lens barrel 101 has four openings that are opened to the second lens barrel 102 side and that have substantially the same area. Then, a single image sensor is placed such that its central position is displaced from the intersecting position of the inner walls 101a and 101b, thereby realizing the image areas 5' to 8' having imaging regions that are different in size. The image areas 5 to 8' function as the image sensors 5 to 8 described above. Note that although the first lens barrel 101 is a quadrangular prism in the example shown in FIG. 20, the shape of the lens barrel is not limited to a quadrangular prism.

Figure 21:
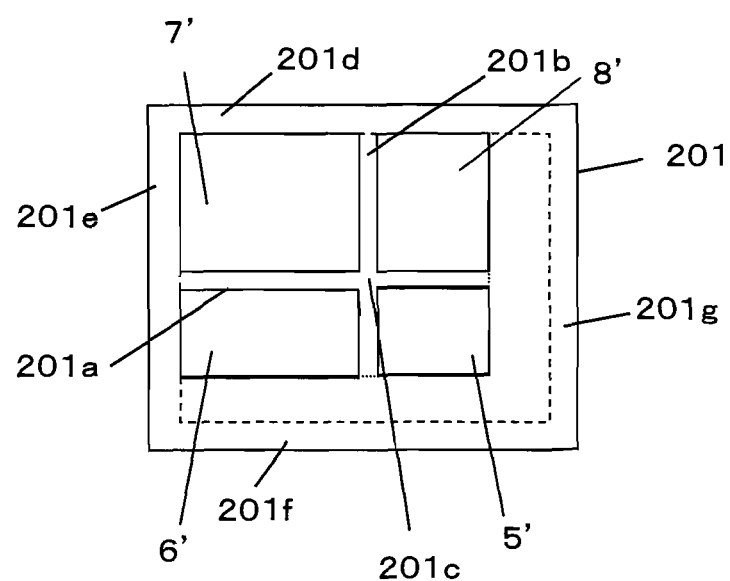
FIG. 21 is a diagram showing another example of the imaging device according to the present invention.

Another configuration example is shown in FIG. 21. In FIG. 21, a first lens barrel 201 has inner walls 201a and 201b that are orthogonal to each other. However, of the four side walls of the first lens barrel 201 shown in FIG. 21, two adjacent side walls 202f and 202g have a larger thickness than the other two adjacent walls 202d and 202e. In other words, in the example shown in FIG. 21, the four openings of the first lens barrel 201 that are opened to the second lens barrel 102 side have areas different from one another. Then, a single image sensor is placed such that its central position coincides with the intersecting position 21c of the inner walls 201a and 201b, thereby realizing the image area 5' to 8' having imaging regions that are different in size. The image areas 5' to 8' function as the image sensors 5 to 8 described above.

That is, in each of the configuration examples shown in FIGS. 19 and 20, and the configuration example shown in FIG. 21 realizes the image area 5' to 8' having imaging regions that are different in size, and therefore, an imaging device including the image areas 5' to 8' achieves the above-described effect of the present invention.

Furthermore, also with an imaging device in which parallax is extracted from multiple sets of images of the same wavelength band, and the distance to a subject is measured based on the extracted parallax (for example, in the configuration shown in FIG. 1, parallax is extracted from the images of the image sensors 5 and 7, and the distance to the subject is measured based on the extracted parallax), the conventional problem that a portion whose distance cannot be measured is generated at the periphery of an image can be solved by configuring the light receiving surfaces of the image sensors so that they are different in size as in this embodiment. The processes of generating a color image by combining images obtained by multiple imaging regions and of measuring the distance to a subject using images obtained by multiple imaging regions (distance measuring process), as described above in this embodiment, are common in that these processes are performed based on the parallax amounts extracted from the images. Therefore, the conventional problem that a portion whose distance cannot be measured is generated at the periphery of an image also can be solved for the distance measuring process by applying this embodiment. An imaging device that performs distance measuring processing readily can be formed, for example, by providing a distance calculating circuit 19 that calculates the distance to a subject based on the parallax extracted from the images of the image sensor 5 and 7 in place of the image combining circuit 16 of the configuration of FIG. 1, as shown in FIG. 7. In addition, an imaging device capable of performing both the color image outputting process and the distance measuring process by including both the image combining circuit 16 and the distance calculating circuit 19 is also an embodiment of the present invention.

Once the parallax amount d in two optical systems has been obtained, the distance z to the subject can be determined using Expression (6) above. In addition, it should emphasized that the imaging device that measures a distance may not need to include four imaging regions, and the distance measurement can be sufficiently performed if at least two imaging regions are provided.

Figure 22:
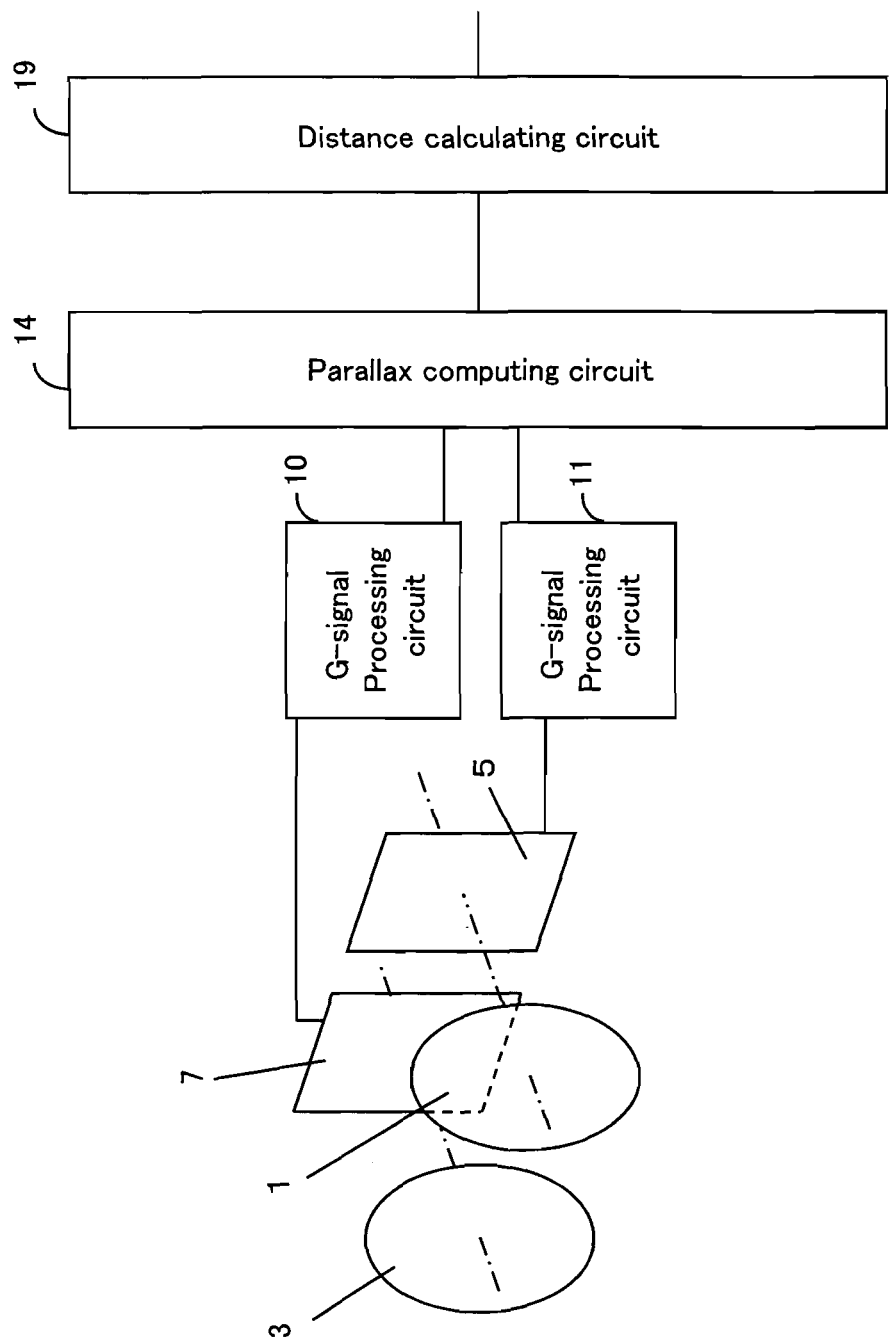
FIG. 22 is a block diagram schematically showing the configuration of a modification of the imaging device according to the third embodiment of the present invention.

More specifically, an imaging device that performs distance measurement readily can be formed by providing an imaging device as shown in FIG. 22 with a distance calculating circuit 19 that calculates the distance to a subject based on the parallax extracted from the images of the image sensors 5 and 7. Here, when using the imaging device according to this embodiment is used as a distance measuring device, once the parallax amount d in two imaging optical systems 1 and 3 has been obtained by the parallax computing circuit 14, the distance z to the subject can be obtained by the distance calculating circuit 19 using Expression (6). In Expression (6), D is the distance between the optical axes of the two imaging optical systems 1 and 3 (D1 in FIG. 23), f is the focal length of the imaging optical systems 1 and 3, d is the parallax amount, and z is the subject distance.

Figure 23:
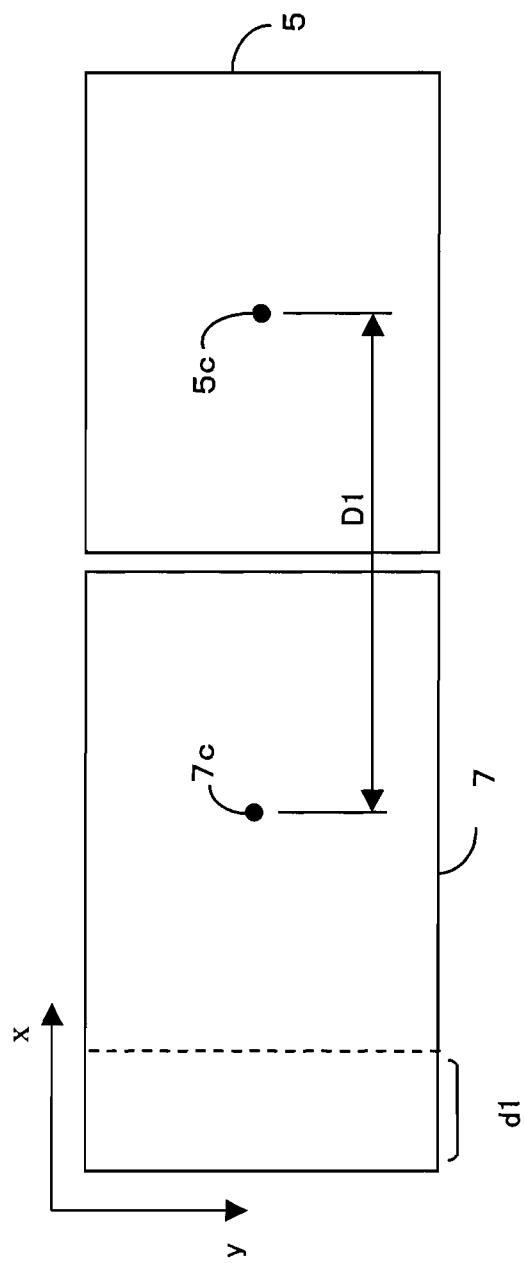
FIG. 23 is a plan view showing the size of the image sensors in the modification of the imaging device according to the third embodiment of the present invention, as viewed from the imaging optical system side.

FIG. 23 is a plan view showing the sizes of the imaging regions of the image sensors 5 and 7 when the image sensors are viewed from the imaging optical systems 1 and 3 side. Here, the parts that have the same functions as those of the first embodiment or the second embodiment are denoted by the same reference numerals. As in the first embodiment, the image sensor 5 outputs the reference image G0, and the image sensor 7 outputs the image G1.

In FIG. 23, a reference numeral 5c denotes the point at which the optical axis defined by the imaging optical system 1 and the image sensor 5 intersects the light receiving surface of the image sensor 5, and a reference numeral 7c denotes the point at which the optical axis defined by the imaging optical system 3 and the image sensor 7 intersects the light receiving surface of the image sensor 7. In addition, the broken lines shown in the image sensor 7 indicate an imaging region having the same size as that of the image sensor 5. D1 is the distance between the point 5c and the point 5c 7c. As can be seen from FIG. 23, the sizes of the image sensors 5 and 7 of the imaging device of this embodiment are different from each other. More specifically, the size of the image sensor 5 that outputs the reference image G0 is smaller than that of the image sensor 7. The size of the image sensor 7 is such that the number of pixels is increased by d1 in the negative x direction, as compared with the image sensor 5.

When A min is the shortest subject distance, f is the focal length of the imaging optical systems 1 and 3, and p is the pixel pitch of the image sensors 5 and 7, the amount of pixel increase in the x direction d1 can be represented by Expression (9) based on the assumption of Expression (1) above. Therefore, when the size of the image sensor 5 is H pixels×V pixels, the size of the image sensor 7 is (H+d1) pixels×V pixels.

Since the image sensor 7 is larger than the image sensor 5 in this configuration, the amount of information comparative to that of the image information of the image sensor 5 can all be extracted from the image sensor 7, even allowing for parallax occurring for the shortest subject distance.

Figure 24:
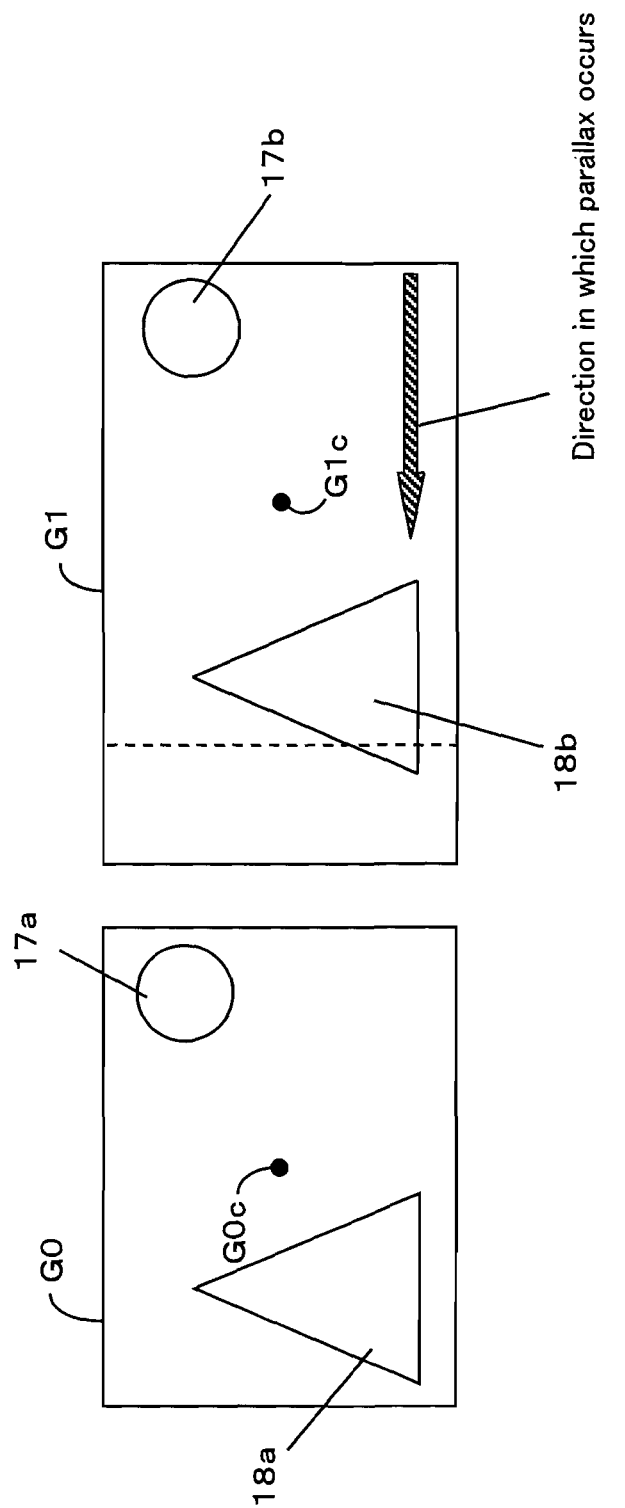
FIG. 24 is a diagram showing the effect of the modification of the imaging device according to the third embodiment of the present invention.

More specifically, since the image sensor 7 has a sufficiently large imaging region, close object 18a that has been imaged at the periphery of the image sensor 5 can be formed in the image sensor 7 without any information omission, as shown in FIG. 24. Accordingly, without performing any complex operation process as that in the second embodiment, it is possible to increase the size of the output pixel region relative to the first embodiment, in addition to improving the conventional problem of a false color at the periphery in optical systems in which parallax occurs for each color information. FIG. 23 shows the light receiving surfaces of the image sensors 5 and 7, as viewed from the imaging optical systems 1 and 3 side, and FIG. 24 shows the imaging signals respectively outputted from the image sensors 5 and 7. Therefore, FIG. 23 and FIG. 24 are in a relation of being vertically and horizontally reversed. In addition, the broken line shown in G1 indicates an imaging region having the same size as G0.

Although this embodiment has been described with regard to a configuration in which two image sensors perform imaging for the green wavelength band, the same effect also can be achieved with a configuration in which light beams having the same wavelength, such as near-infrared radiation, are detected. The same effect also can be achieved by forming a Bayer array color filter or the like in each of the image sensors so that a color image can be detected. Although multiple combinations of imaging optical systems and image sensors are provided in the horizontal direction of the image sensors (the x direction shown in FIG. 22), it should be emphasized that the same effect also can be achieved by providing multiple combinations of optical systems and image sensors in the vertical direction.

Figure 15:
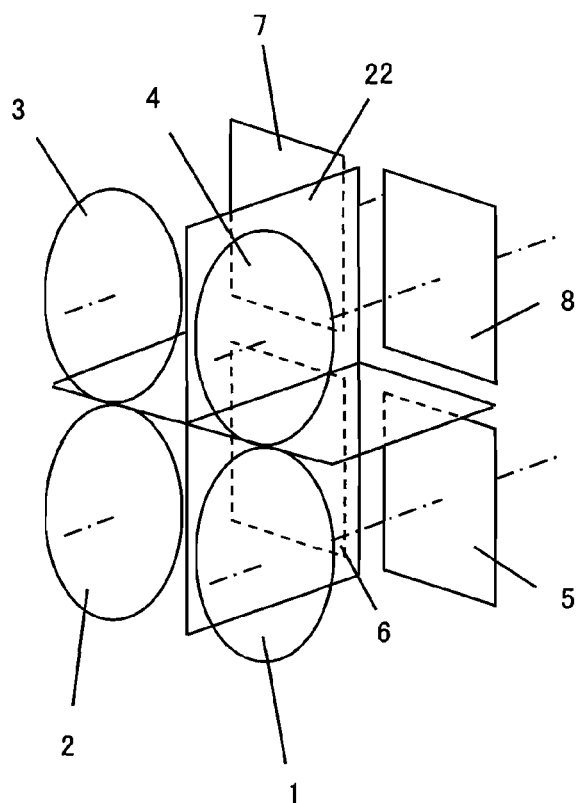
FIG. 15 is a perspective view showing a modification of the imaging devices according to the first to third embodiments.

As shown in FIG. 15, it is preferable that light-shielding walls 22 are provided at the boundaries between the image sensor 5 to 8 in each of the first to third imaging devices described above, in order to prevent the light beams transmitted through the imaging optical systems 1 to 4 from entering an image sensor other than their respectively corresponding image sensors. It is more preferable that the light-shielding walls 22 have a height extending from the mounting surfaces of the image sensors 5 to 8 and reaching the mounting surfaces of the imaging optical systems 1 to 4.

Figure 16:
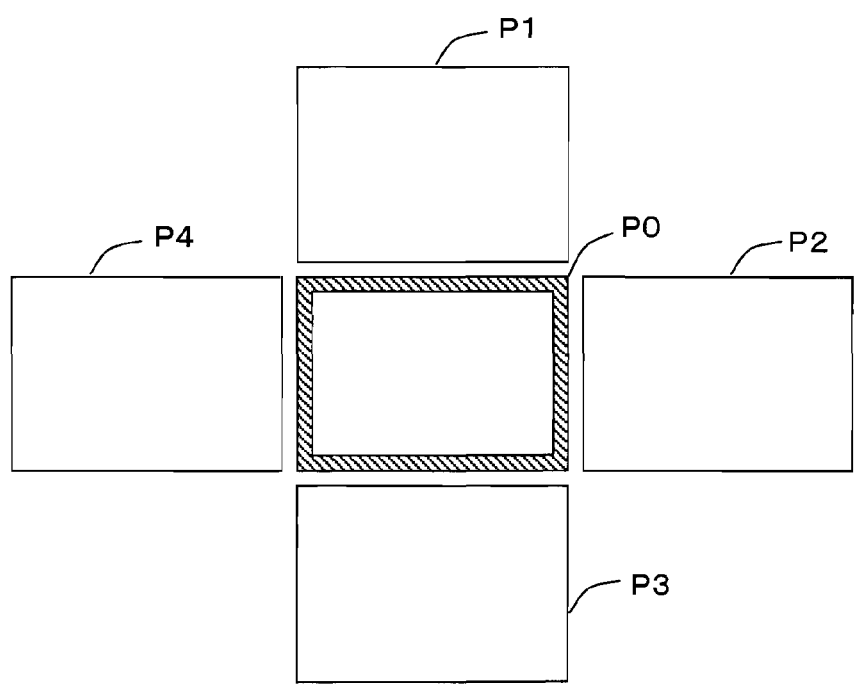
FIG. 16 is a diagram illustrating a further modification of the imaging devices according to the first to third embodiments.
Figure 18:
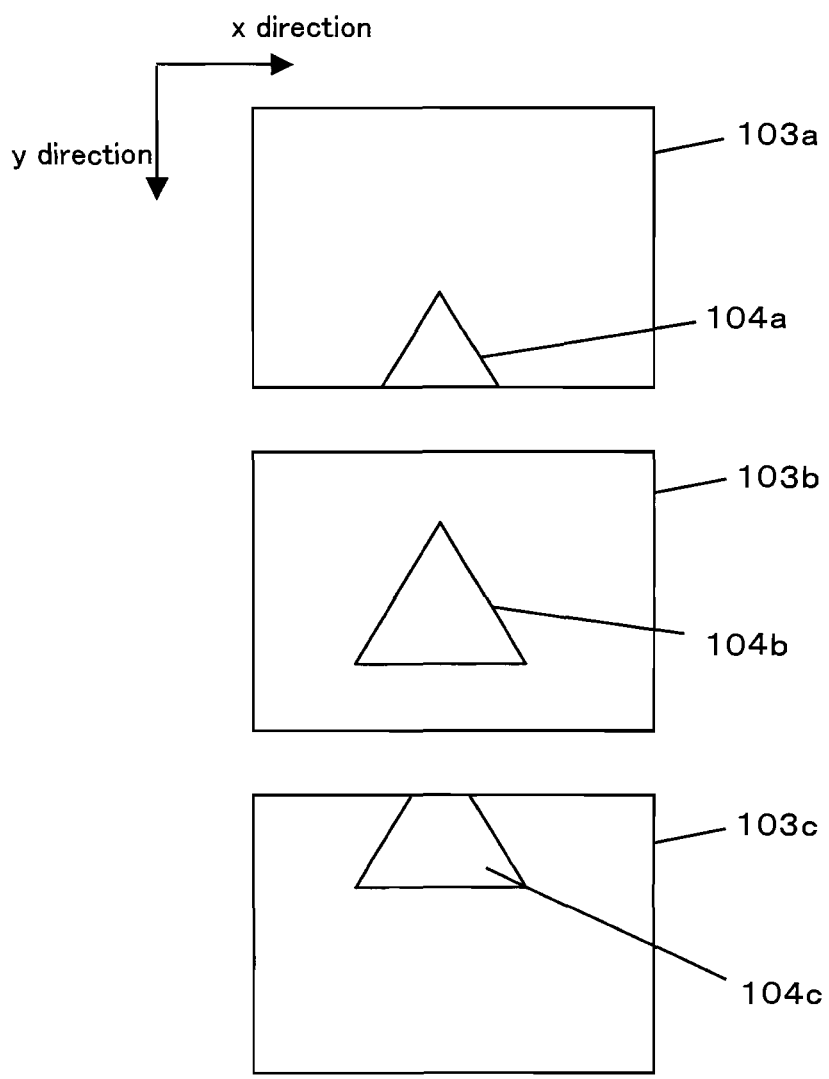
FIG. 18 is a diagram illustrating parallax that occurs in the conventional imaging device.

In each of the embodiments described above, the imaging device including four imaging optical systems and four image sensors was described as an example, and therefore, the description was given of an example in which the pixels are deleted in a L shape along two sides of the reference image (e.g., FIG. 3, FIG. 9 and so on), or an example in which the size of the light receiving surface of the image sensor is increased in two directions, as shown in FIG. 13. However, it is also possible to adopt a configuration including, for example, five imaging optical systems and five image sensors that are arranged such that four image sensors are each adjacent to one of the four sides of a single image sensor. In the case of such a configuration, as shown in FIG. 16, an image P0 outputted from the central image sensor is used as the reference image, and a color image is generated by obtaining the parallax of images P1 to P4 outputted from other image sensors, relative to the reference image P0, correcting the parallax of the images P1 to P4 and combining the resulting images with the reference image P0. In this case, as indicated by the shaded area in FIG. 16, the pixels are appropriately deleted along the four sides of the reference image P0.

Industrial Applicability

The present invention is applicable to various applications such as mobile devices and automobile use as a low-profile imaging device for which the problems of generation of a false color at the periphery of an image and of incapability of distance measurement at the periphery of an image have been solved.

The invention claimed is:

1. An imaging device comprising:
a plurality of lens portion each including at least one lens;
a plurality of imaging regions corresponding one-to-one with the plurality of lens portions, the plurality of imaging regions each including a light receiving surface substantially perpendicular to an optical axis direction of the corresponding lens portion, and each outputting an imaging signal;

a parallax computing portion that uses any one of imaging signals respectively outputted from the plurality of imaging regions as a reference imaging signal, and computes a parallax amount of other imaging signals relative to the reference imaging signal; and an effective pixel region correcting portion that deletes pixel signals on a row-by-row and/or column-by-column basis from the reference imaging signal, the pixel signals to be deleted being obtained from the pixels corresponding to a periphery of an image, and outputs the resulting effective pixel signal, wherein the plurality of imaging regions are first to fourth imaging regions arranged in two vertical rows and two horizontal lines, the parallax computing portion uses an imaging signal outputted from the first imaging region as a reference imaging signal, and the effective pixel region correcting portion deletes, from the reference imaging signal, pixel signals obtained from pixels on a side located in the positive direction of the direction of parallax that a second imaging signal outputted from the second imaging region laterally adjacent to the first imaging region has relative to the reference imaging signal, and a side located in the positive direction of the direction of parallax that a third imaging signal outputted from the third imaging region longitudinally adjacent to the first imaging region has relative to the reference imaging signal.

2. The imaging device according to claim 1, further comprising
an image combining portion that generates a composite image by correcting and combining the plurality of imaging signals based on the effective pixel signal outputted from the effective pixel region correcting portion and the parallax amount computed by the parallax computing portion, and outputs the composite image.

3. The imaging device according to claim 1, further comprising
a distance calculating portion that calculates the distance to a subject based on the effective pixel signal outputted from the effective pixel region correcting portion and the parallax amount computed by the parallax computing portion.

4. The imaging device according to claim 1,
wherein the effective pixel region correcting portion determines the continuous arrangement of the pixels of the pixel signals to be deleted based on the parallax amount of a subject located at a shortest subject distance.

5. The imaging device according to claim 1,
wherein, of the first to fourth imaging regions, the first imaging region and the fourth imaging region that are diagonally arranged are sensitive to the same wavelength range, and the second imaging region and the third imaging region are sensitive to wavelength ranges that are different from that of the first and fourth imaging regions and that are different from each other, and the parallax computing portion uses the imaging signal outputted from the first imaging region as a reference imaging signal, obtains a parallax amount that a fourth imaging signal outputted from the fourth imaging region has relative to the reference imaging signal, and decomposes the parallax amount into vectors, thereby obtaining a parallax amount that the second imaging signal has relative to the reference imaging signal, and a parallax amount that the third imaging signal has relative to the reference imaging signal.

6. The imaging device according to claim 5,
wherein the first and fourth imaging regions are sensitive to the green wavelength range, and the second and third imaging regions are sensitive to the red wavelength range and the blue wavelength range, respectively.

7. The imaging device according to claim 1, further comprising
an omission determining portion that divides, into blocks, a region in the reference imaging signal that may contain image omission resulting from parallax in imaging signal other than the reference imaging signal, obtains a parallax amount for each of the blocks, and determines, based on the obtained parallax amount, whether or not each of the blocks will be actually omitted in the imaging signal other than the reference imaging signal, wherein the effective pixel region correcting portion includes, in the effective pixel signal, the pixels of the block that has been determined not to be omitted by the omission determining portion.

\* \* \* \* \*